United States Patent
Mochizuki

(10) Patent No.: US 8,698,796 B2
(45) Date of Patent: Apr. 15, 2014

(54) IMAGE PROCESSING APPARATUS, IMAGE PROCESSING METHOD, AND PROGRAM

(75) Inventor: Daisuke Mochizuki, Chiba (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 12/891,124

(22) Filed: Sep. 27, 2010

(65) Prior Publication Data

US 2011/0115786 A1 May 19, 2011

(30) Foreign Application Priority Data

Nov. 16, 2009 (JP) .................................. 2009-260850

(51) Int. Cl.
 *G06T 19/00* (2011.01)
 *G06T 17/20* (2006.01)

(52) U.S. Cl.
 USPC .......................................... 345/419; 345/420

(58) Field of Classification Search
 None
 See application file for complete search history.

(56) References Cited

U.S. PATENT DOCUMENTS

| | | | | |
|---|---|---|---|---|
| 5,995,110 A | * | 11/1999 | Litwinowicz | 715/848 |
| 6,944,320 B2 | * | 9/2005 | Liu et al. | 382/118 |
| 2007/0127810 A1 | * | 6/2007 | Liu | 382/154 |

FOREIGN PATENT DOCUMENTS

JP 2006-107145 4/2006

OTHER PUBLICATIONS

"Draft_claims_12891124_ExaminersAmendment", Nov. 25, 2013.*
"Correspondence_ATT_12891124", Nov. 25, 2013.*

* cited by examiner

*Primary Examiner* — Kee M Tung
*Assistant Examiner* — Sing-Wai Wu
(74) *Attorney, Agent, or Firm* — Oblon, Spivak, McClelland, Maier & Neustadt, L.L.P.

(57) ABSTRACT

In an image processing apparatus, a feature point acquirer acquires feature points, which are characteristic points on a face in an image presenting a face. A supplementary feature point calculator calculates supplementary feature points on the basis of the feature points acquired by the feature point acquirer. An image transform unit utilizes the feature points and the supplementary feature points to transform the image so as to match the structure of a face in a projected image that depicts the surface of a given three-dimensional face shape projected onto a flat plane.

8 Claims, 26 Drawing Sheets

FIG. 11
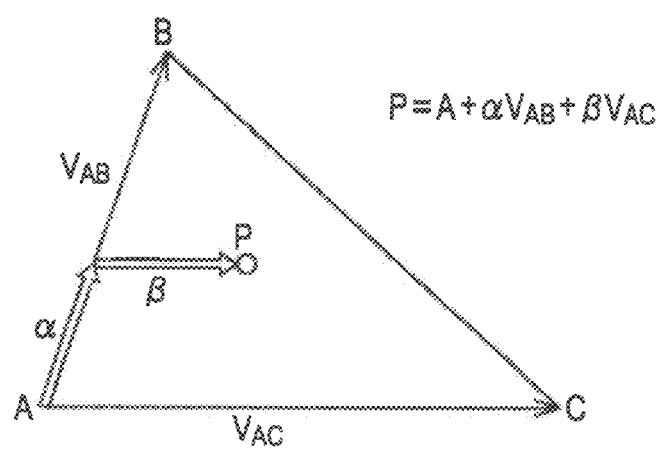
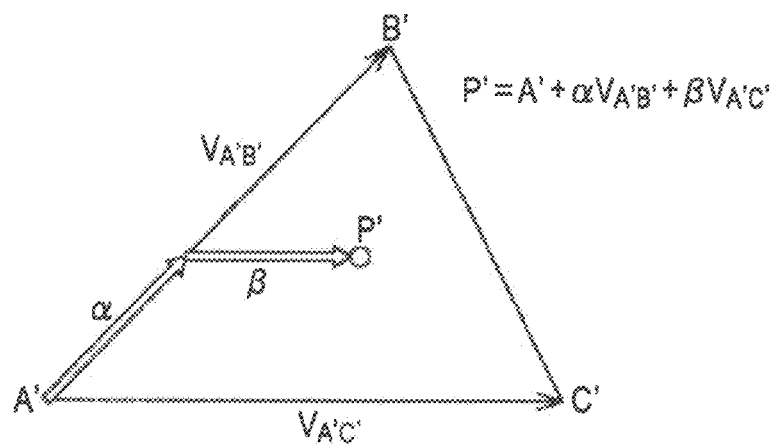

FIG. 22
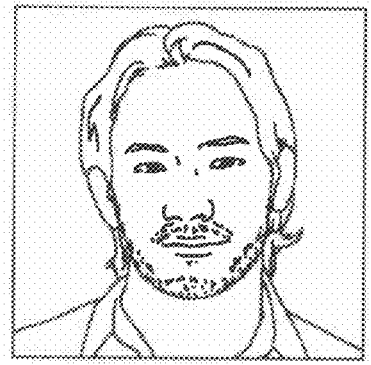
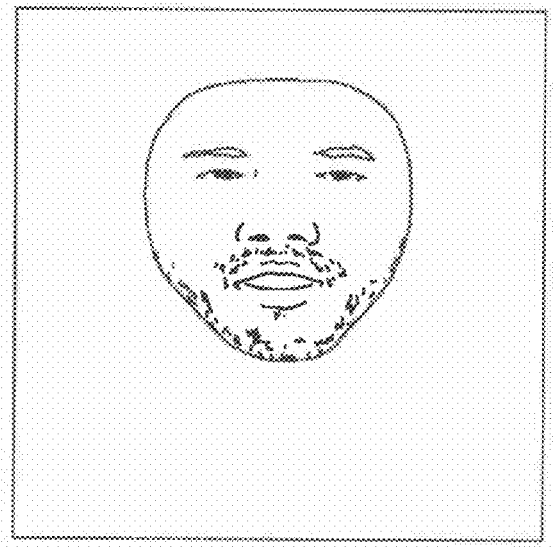
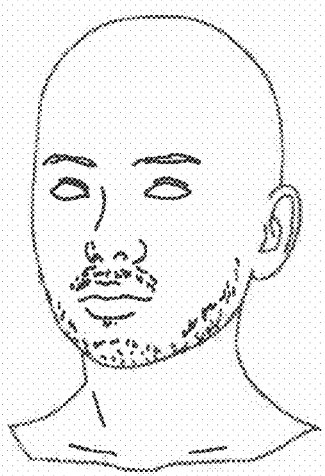

FIG. 23
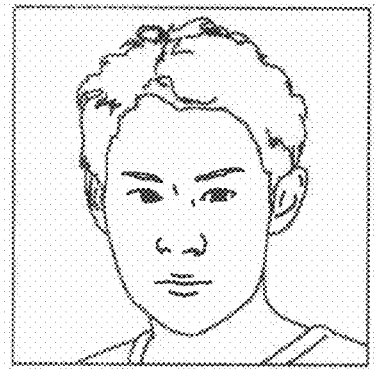
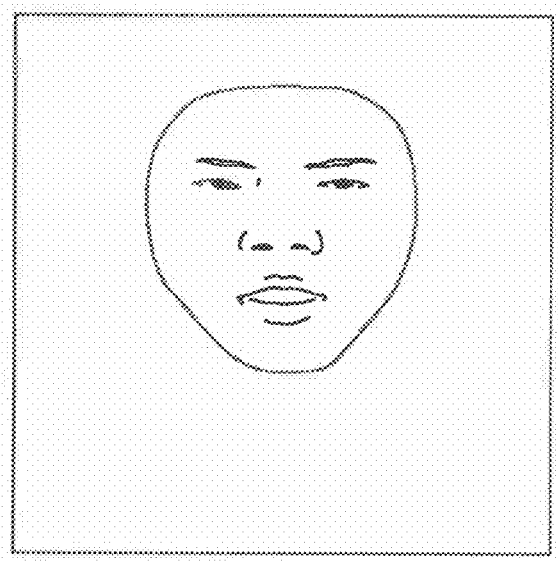
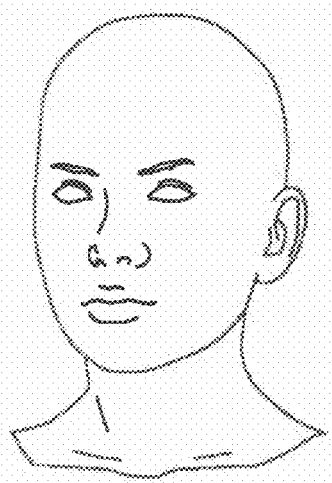

FIG. 24
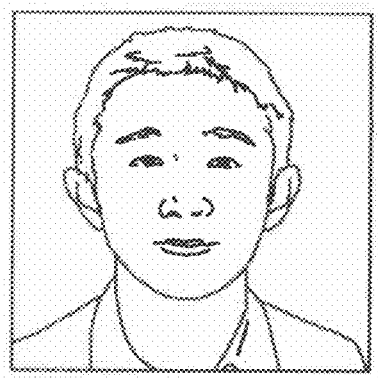
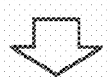
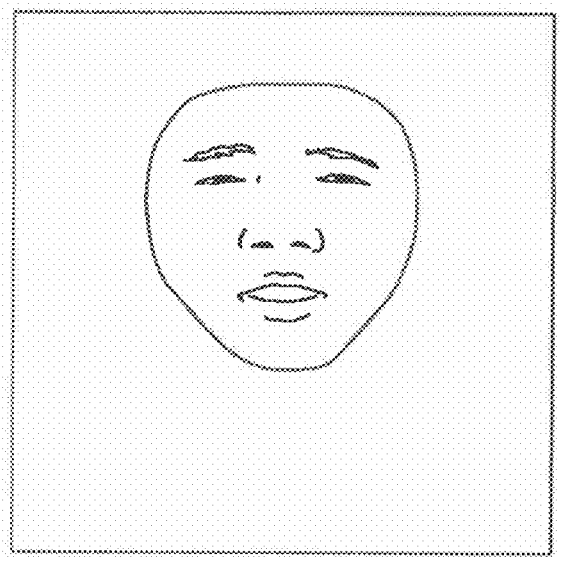
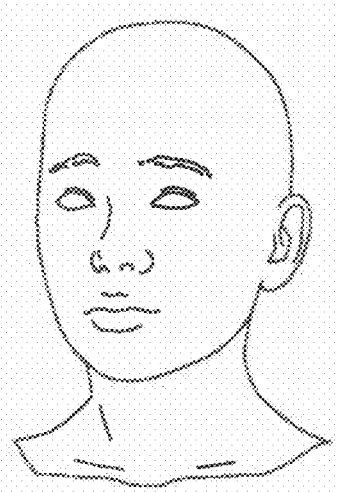

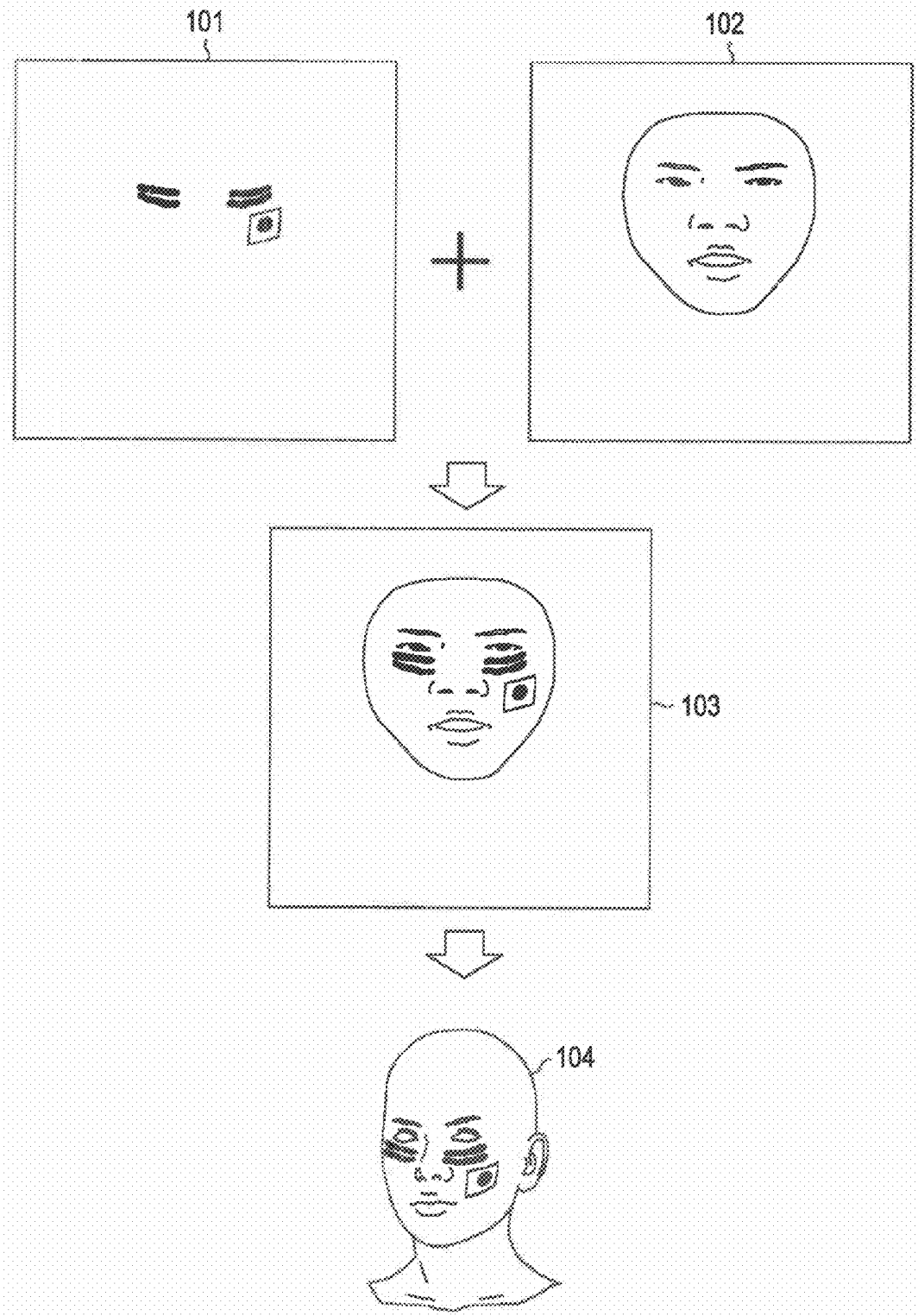

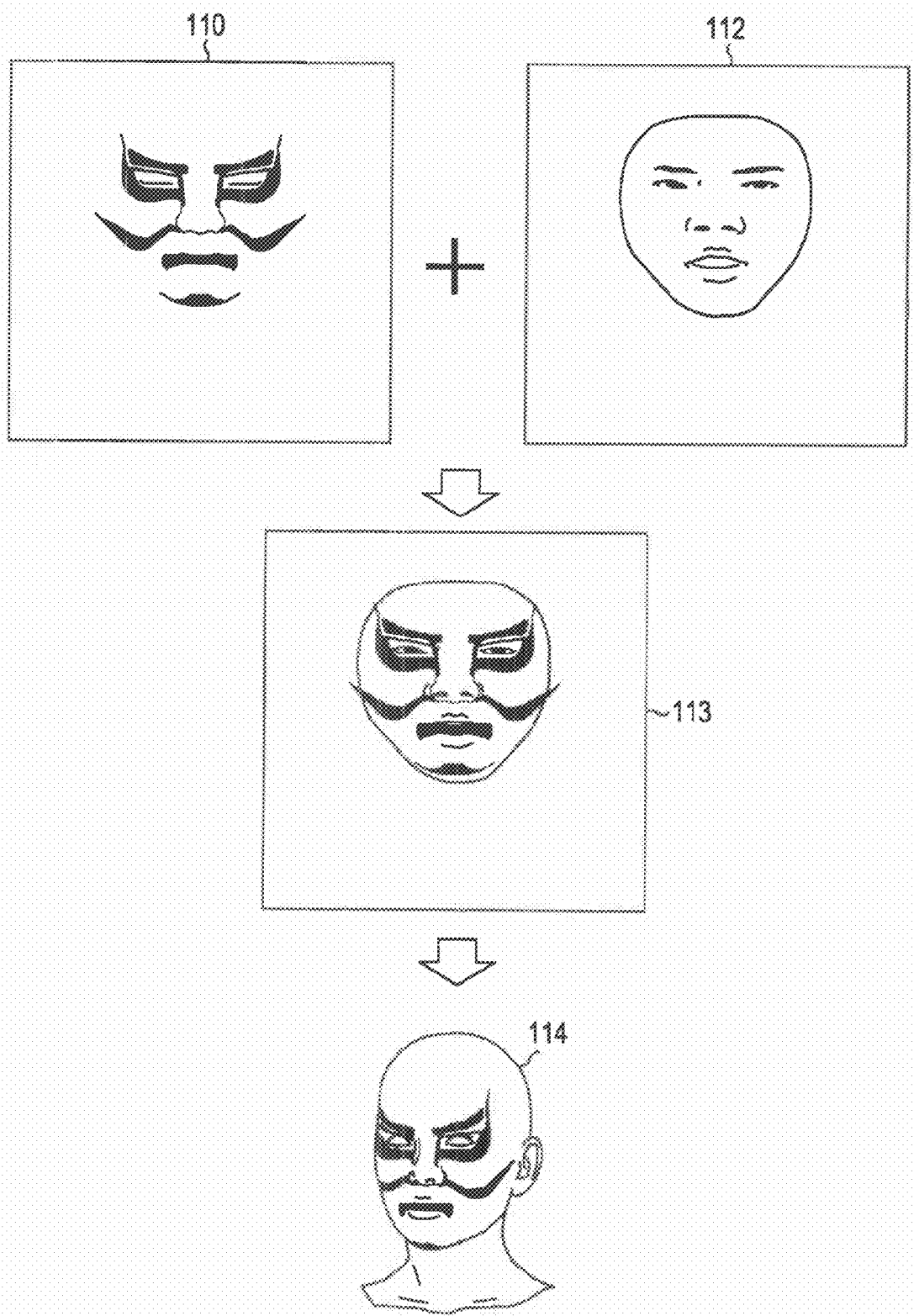

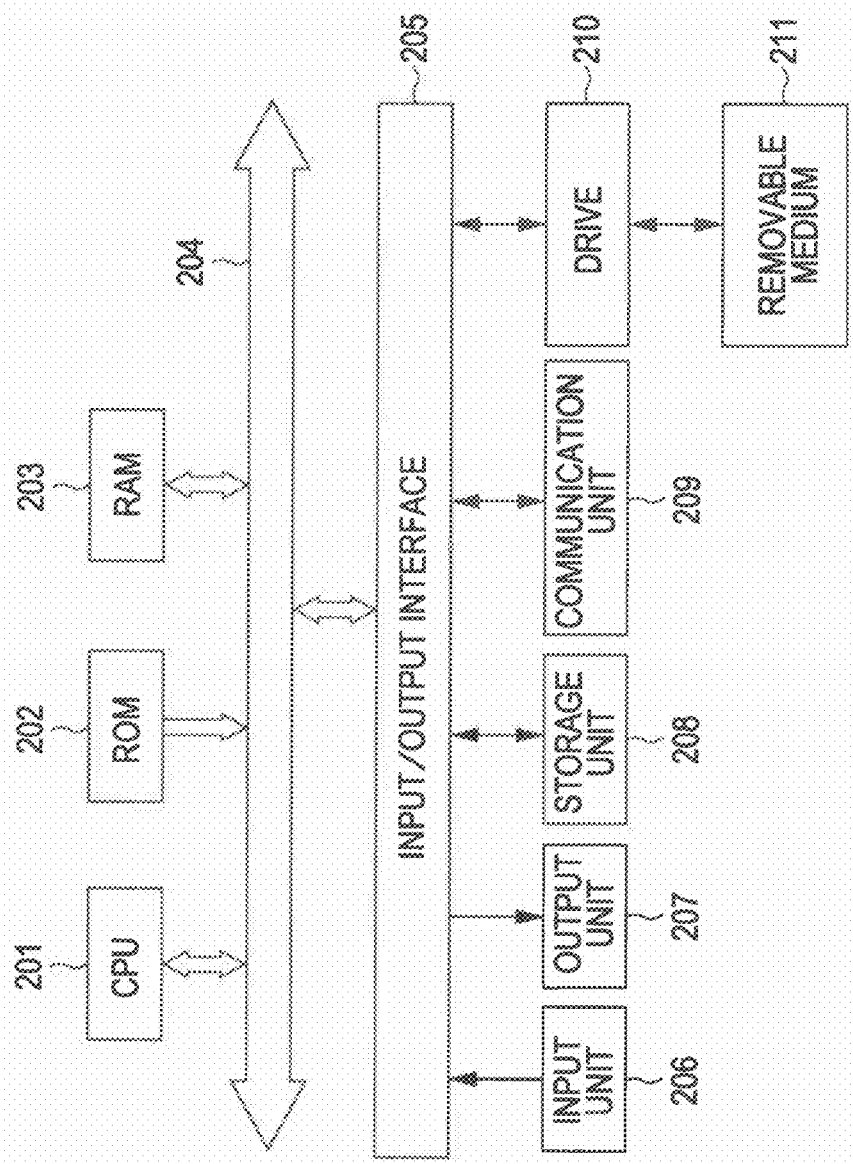

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More particularly, the present invention relates to an image processing apparatus, an image processing method, and a program able to generate texture images that can be correctly applied to face shapes.

2. Description of the Related Art

In the related art, three-dimensional (3D) face models are used in the production of computer graphics (CG) for applications such as video games and movies.

As shown by way of example in FIG. 1, a 3D face model is made up of the following: a face shape, which is based on shape data that expressing a face's shape in three dimensions; and a texture image, which is applied to the surface of the face shape. In addition, since the texture image is a flat projection of a three-dimensional curved surface, the texture image differs from an image acquired by shooting a face looking forward with an ordinary imaging apparatus. Instead, the texture image is an image that expresses a face in a deformed way.

For example, in Japanese Unexamined Patent Application Publication No. 2006-107145, there is disclosed a method for simultaneously acquiring a face shape and a texture image. By simultaneously acquiring a face shape and a texture image in this way, and then applying the texture image to the face shape from the direction in which the texture image was acquired, the texture image can be correctly applied to the face shape.

SUMMARY OF THE INVENTION

On the other hand, in cases where a texture image for an arbitrary face is applied to a pre-modeled face shape, the facial features in the face shape and the texture image do not match up. For this reason, it is difficult to correctly apply a texture image to a face shape.

In light of such circumstances, it is desirable to provide technology able to generate texture images that can be correctly applied to face shapes.

An image processing apparatus in accordance with an embodiment of the present invention is provided with: feature point acquiring means for acquiring feature points, which are characteristic points on a face in an image presenting a face; supplementary feature point calculating means for calculating supplementary feature points on the basis of the feature points acquired by the feature point acquiring means; and transform means for utilizing the feature points and the supplementary feature points to transform the image so as to match the structure of a face in a projected image that depicts the surface of a given three-dimensional face shape projected onto a flat plane.

An image processing method or program in accordance with another embodiment of the present invention includes the steps of: acquiring feature points, which are characteristic points on a face in an image presenting a face; calculating, supplementary feature points on the basis of the feature points; and utilizing the feature points and the supplementary feature points to transform the image so as to match the structure of a face in a projected image that depicts the surface of a given three-dimensional face shape projected onto a flat plane.

According to an embodiment of the present invention, feature points are acquired, which are characteristic points on a face in an image presenting a face. Supplementary feature points are calculated on the basis of these feature points, and both the feature points and the supplementary feature points are utilized to transform the image so as to match the structure of a face in a projected image that depicts the surface of a given three-dimensional face shape projected onto a flat plane.

According to an embodiment of the present invention, it is possible to generate texture images that can be correctly applied to face shapes.

BRIEF DESCRIPTION OF THE DRAWINGS

FIG. 11 is a diagram for explaining a process for transforming a triangular region;

FIG. 22 is a diagram for explaining a face model reflecting different users' faces;

FIG. 23 is a diagram for explaining a face model reflecting different users' faces;

FIG. 24 is a diagram for explaining a face model reflecting different users' faces;

FIG. 25 illustrates a face model presenting face painting;

FIG. 26 illustrates a face model applied with kumadori makeup; and

FIG. 27 is a block diagram illustrating an exemplary configuration of a computer to which an embodiment of the present invention has been applied.

DESCRIPTION OF THE PREFERRED EMBODIMENTS

Hereinafter, specific embodiments of the present invention will be described in detail and with reference to the accompanying drawings.

Figure 1:
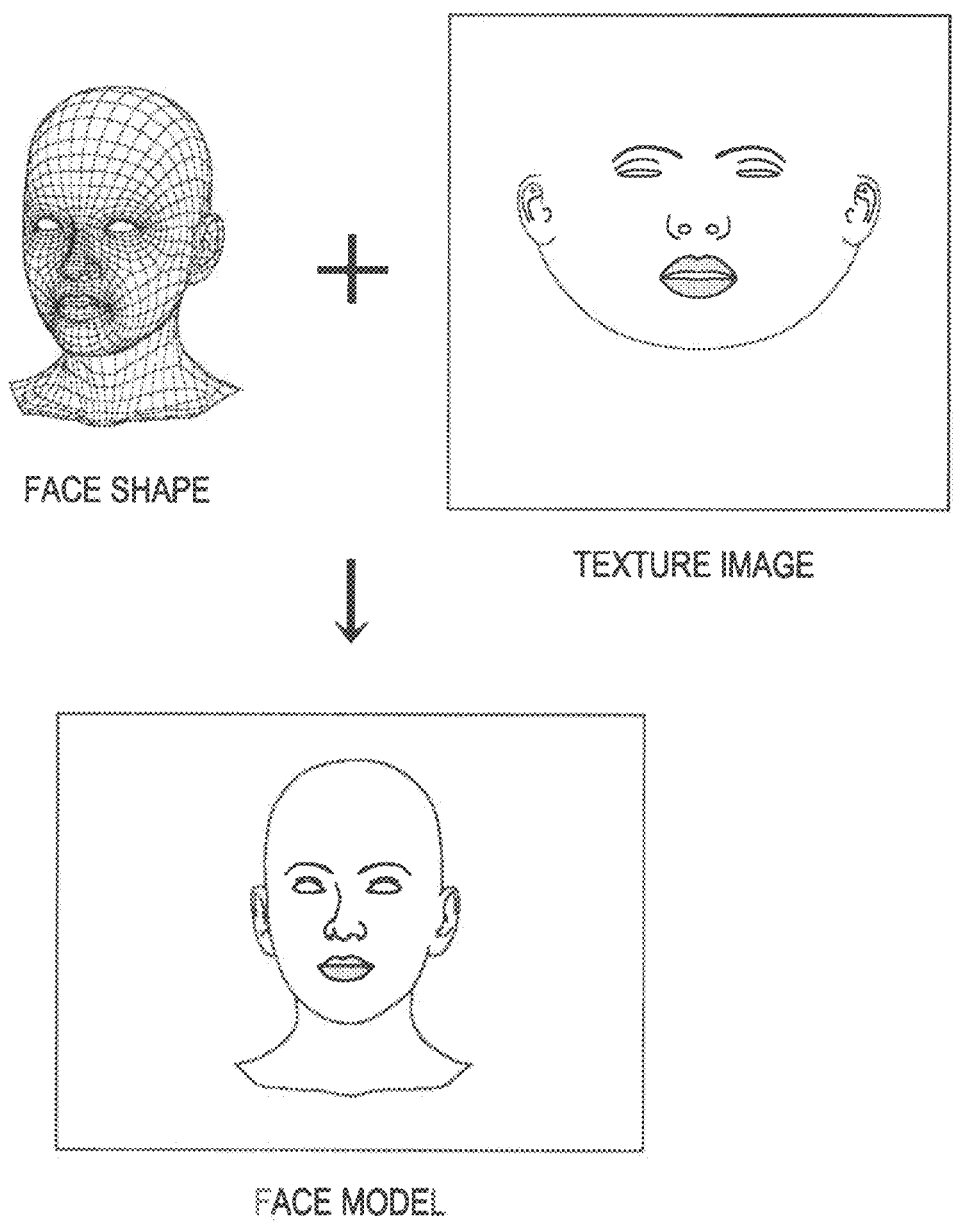
FIG. 1 is a diagram for explaining the structure of a 3D face model.
Figure 2:
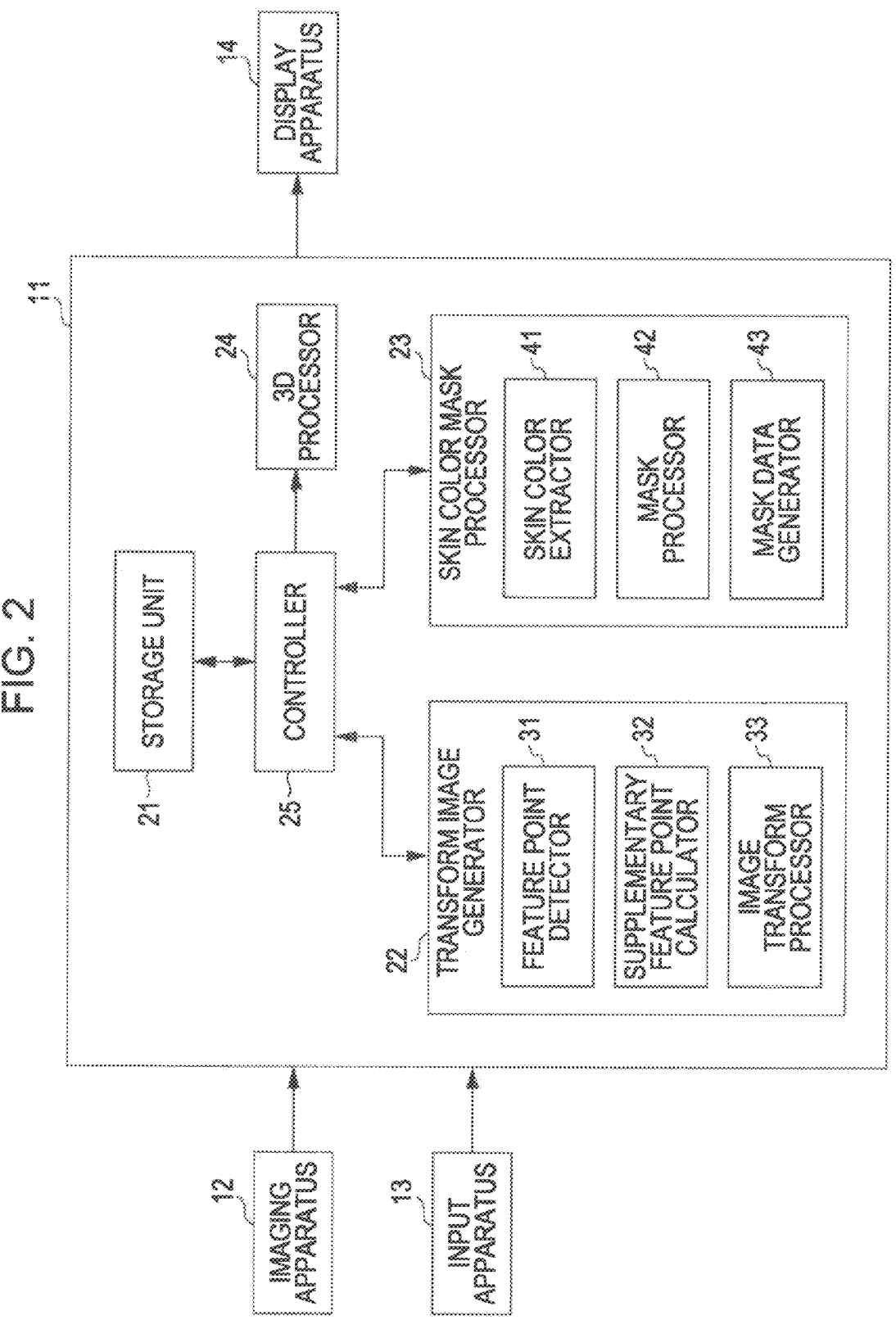
FIG. 2 is a block diagram illustrating an exemplary configuration of an image processing system to which an embodiment of the present invention has been applied.

FIG. 2 is a block diagram illustrating an exemplary configuration of an image processing system to which an embodiment of the present invention has been applied. In the present specification, a system refers to the entirety of an apparatus realized by a plurality of component apparatus.

In FIG. 2, the image processing system is configured with an imaging apparatus 12, an input apparatus 13, and a display apparatus 14 connected to an image processing apparatus 11.

The imaging apparatus 12 is provided with: optics, which include components such as a lens and an diaphragm; and an imaging unit, such as a charge-coupled device (CCD) or complementary metal-oxide semiconductor (CMOS) sensor. The imaging apparatus 12 acquires an optical image of a subject focused onto the photosensitive surface of the imaging unit via the optics. Data for the image obtained as a result is then supplied to the image processing apparatus 11.

The input apparatus 13 includes elements such as buttons and switches, or a touch panel overlayed with the display apparatus 14. The input apparatus 13 supplies the image processing apparatus 11 with signals according to user operations.

The display apparatus 14 includes a liquid crystal display (LCD) or an organic electro luminescence (EL) display. The display apparatus 14 display various images in accordance with image data supplied from the image processing apparatus 11.

The image processing apparatus 11 is provided with a storage unit 21, a transform image generator 22, a skin color mask processor 23, a 3D processor 24, and a controller 25.

The storage unit 21 stores information such as data for images acquired by the imaging apparatus 12, and data for texture images generated by the transform image generator 22 and the skin color mask processor 23. In addition, various data used in image processing conducted by the image processing apparatus 11 is also stored in the storage unit 21. For example, shape data expressing the shapes of faces in three dimensions may be stored in advance in the storage unit 21.

Following control instructions from the controller 25, the transform image generator 22 reads out image data stored in the storage unit 21 and conducts a transform image generation process. In this process, a transform image is generated by transforming the face appearing in the retrieved image to match the structure of the face in the texture image.

The transform image generator 22 is provided with a feature point detector 31, a supplementary feature point calculator 32, and an image transform processor 33. As described later with reference to FIG. 5, the feature point detector 31 detects feature points from a face appearing in an image. As described later with reference to FIG. 6, the supplementary feature point calculator 32 calculates supplementary feature points from a face appearing in an image. As described later with reference to FIGS. 8 to 11, the image transform processor 33 uses the feature points and supplementary feature points to generate a transform image by conducting the image transform process for transforming a face appearing in an image.

Following control instructions from the controller 25, the skin color mask processor 23 conducts a skin color mask process. In this process, the background in the transform image generated by the transform image generator 22 (i.e., the portion of the image extending outward from the outline of the face) is substituted with a skin color extracted from the face in the image. By applying a skin color mask to the transform image in this way, a texture image is generated from an image presenting the user's face. The skin color mask processor 23 then causes the data for the texture image to be stored in the storage unit 21.

The skin color mask processor 23 is provided with a skin color extractor 41, a mask processor 42, and a mask data generator 43. As described later with reference to FIG. 14, the skin color extractor 41 extracts a skin color from a set region defined by supplementary feature points. As described later with reference to FIGS. 15 and 16, the mask processor 42 performs a mask process for substituting a portion of the transform image with the skin color. As described later with reference to FIGS. 17 and 18, the mask data generator 43 generates mask data used by the mask processor 42 in the mask process.

Following control instructions from the controller 25, the 3D processor 24 conducts a face model generation process. In this process, the texture image generated by the transform image generator 22 and the skin color mask processor 23 is applied to a face shape based on shape data stored in the storage unit 21. In addition, the 3D processor 24 conducts a process for converting the face model expressed as a 3D shape into a 2D image for display on the display apparatus 14. Data for the image obtained as a result is then supplied to the display apparatus 14, and the face model is displayed.

The controller 25 is provided with components such as a central processing unit (CPU), read-only memory (ROM), random access memory (RAM), and flash memory (such as Electronically Erasable and Programmable Read-Only Memory (EEPROM), for example). As a result of the CPU loading into RAM and executing a program stored in the ROM or flash memory, the controller 25 controls the various components of the image processing apparatus 11.

Figure 3:
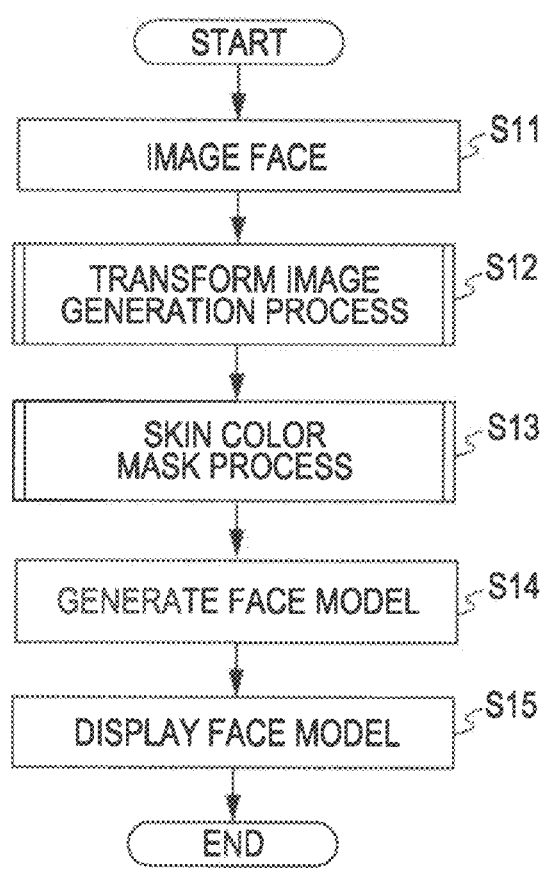
FIG. 3 is a flowchart explaining a process for imaging a user's face and displaying a face model.

FIG. 3 is a flowchart explaining a process whereby the image processing system in FIG. 2 images a user's face and displays a face model.

This process is initiated when, for example, the user positions himself or herself directly opposite the imaging apparatus 12 and operates the input apparatus 13 so as to acquire a frontal image of his or her face. In step S11, the imaging apparatus 12 acquires an image at a timing according to the user operation, and supplies the acquired image to the image processing apparatus 11.

After the processing in step S11, the process proceeds to step S12. In step S12, the transform image generator 22 takes the image acquired by the imaging apparatus 12 in step S11, and conducts the transform image generation process for generating a transform image (see FIG. 7 later described). In the transform image generation process, the region where the face appears in the image being processed (hereinafter referred to as the original image, where appropriate) is transformed to match the structure of a face in a texture image. In so doing, a transform image is generated. The transform image generator 22 then supplies the skin color mask processor 23 with the transform image generated by the transform image generation process, and the process proceeds to step S13.

In step S13, the skin color mask processor 23 conducts the skin color mask process (see FIG. 16 later described). In the skin color mask process, the background in the transform image supplied from the transform image generator 22 is substituted with a skin color extracted from the face appearing in the original image. In so doing, a texture image is generated. The skin color mask processor 23 then causes the texture image generated by the skin color mask process to be stored in the storage unit 21, and the process proceeds to step S14.

In step S14, the 3D processor 24 reads out a face shape and the texture image stored in the storage unit 21, and generates a face model by applying the texture image to the face shape. The 3D processor 24 then converts the generated face model into a 2D image for display on the display apparatus 14, and supplies the display apparatus 14 with data for the image obtained as a result. The process then proceeds to step S15.

In step S15, the display apparatus 14 displays an image based on the data supplied from the 3D processor 24 in step S14. In other words, the display apparatus 14 displays an image of the face model expressed by the texture image, which was generated from an image presenting the user's face. The process is then terminated.

The process whereby the transform image generator 22 generates a transform image will now be described with reference to FIG. 4.

The feature point detector 31 of the transform image generator 22 detects feature points from an original image 61 presenting the user's face, for example. Herein, feature points are characteristic points on a particular face. Additionally, the supplementary feature point calculator 32 calculates supplementary feature points on the basis of the feature points detected by the feature point detector 31. In so doing, feature points and supplementary feature points are set with respect to the original image 61, as illustrated by the image 62. In the image 62, feature points are indicated by circles, and supplementary feature points are indicated by triangles.

Subsequently, the image transform processor 33 of the transform image generator 22 conducts an image transform process. In the image transform process, the original image 61 is transformed such that the feature points and supplementary feature points that were detected and calculated from the original 61 respectively match feature points and supplementary feature points set in a texture image. Herein, a texture image is a flat projection of the three-dimensional surface of a face shape to which the texture image is applied (see FIG. 9 later described). As a result of the image transform process, a transform image 63 is generated.

The feature points and supplementary feature points detected and calculated from an original image will now be described with reference to FIGS. 5 and 6.

Figure 5:
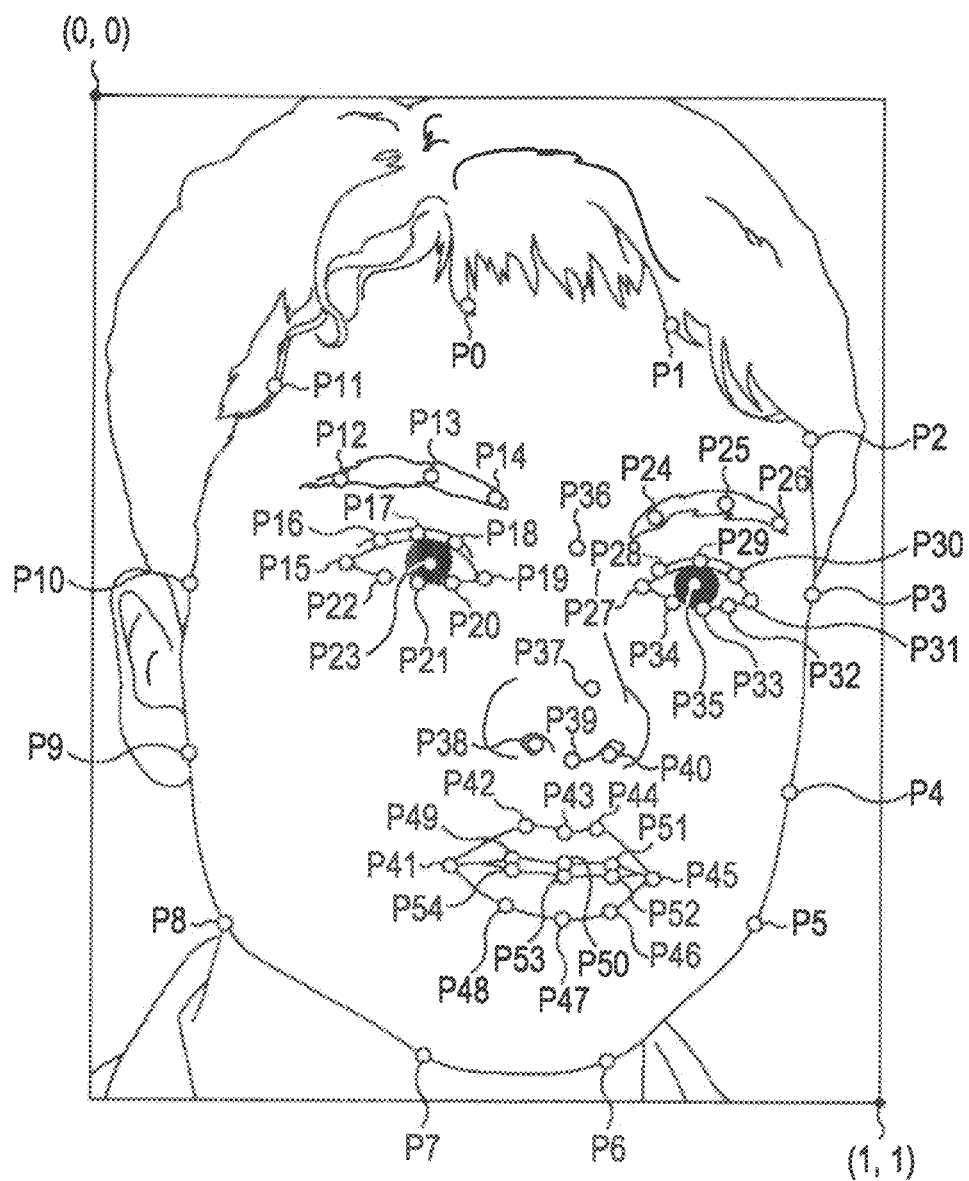
FIG. 5 is a diagram for explaining feature points set in a face region.

FIG. 5 illustrates a rectangular face region that has been recognized as the region where the face appears in an original image. In this face region, feature points are indicated by circles.

Typically, color variation tends to increase at the face outline, the eyebrow positions, the eye boundaries, the nose boundaries, and the mouth boundaries. For this reason, on the basis of the color variation in the original image, the feature point detector 31 detects feature points so as to cover points of significant color variation. Then, the feature point detector 31 sets the 55 feature points P0 to P54 with respect to the face region, as illustrated in FIG. 5.

For example, the feature point detector 31 may set the feature points P0 to P11 along the face outline, the feature points P12 to P14 on the right eyebrow, and the feature points P15 to P23 on the right eye. In addition, the feature point detector 31 may set the feature points P24 to P26 on the left eyebrow, the feature points P27 to P35 on the left eye, the feature points P36 to P40 on the nose, and the feature points P41 to P54 on the mouth.

It should be appreciated that the technology whereby the feature point detector 31 detects feature points is typically public, and that feature points may be automatically set by using such technology. Alternatively, the user may operate the input apparatus 13 to interactively set feature points with respect to a face region displayed on the display apparatus 14. The feature point detector 31 may then acquire the feature points thus input, and set the feature points in the face region.

Figure 6:
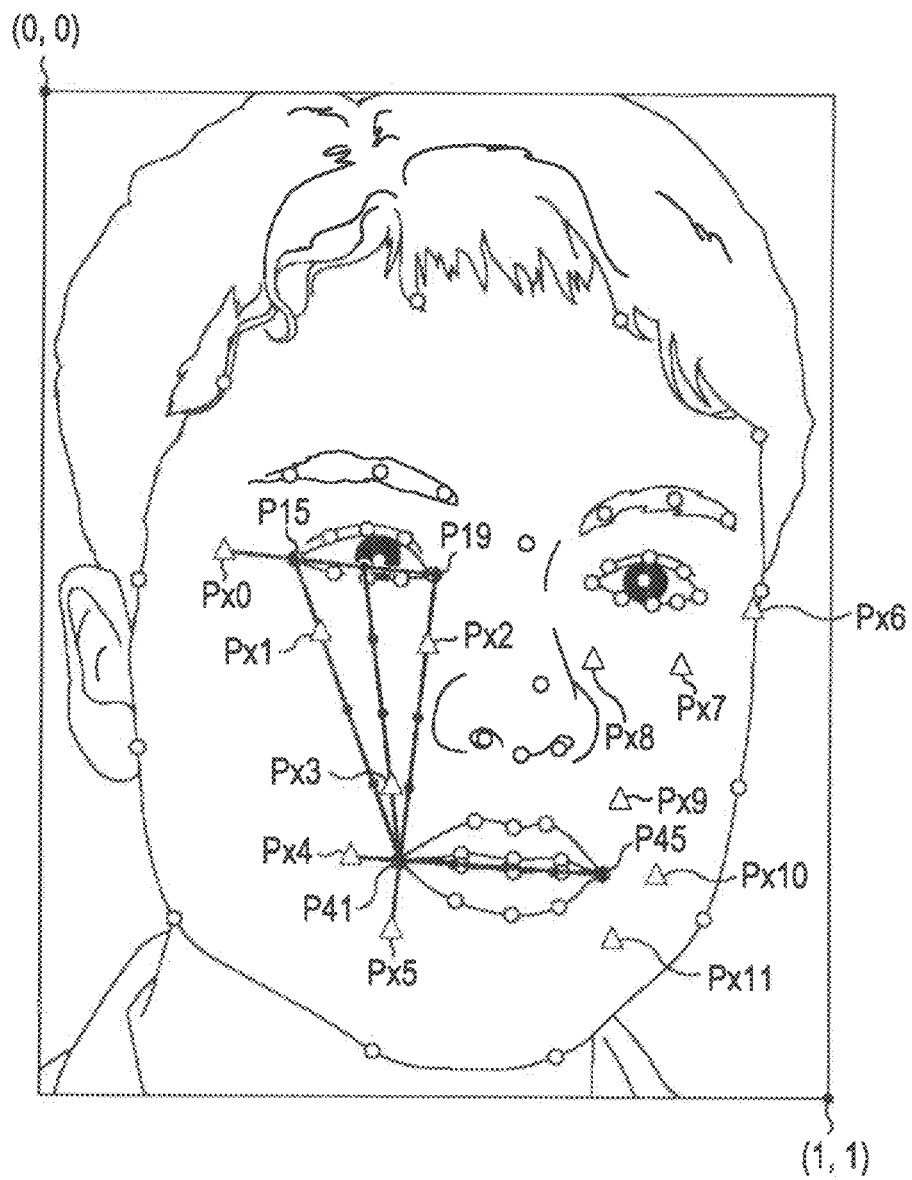
FIG. 6 is a diagram for explaining supplementary feature points set in a face region.

Next, FIG. 6 illustrates 12 supplementary feature points Px0 to Px11 that are set by the supplementary feature point calculator 32 in addition to the feature points illustrated in FIG. 5.

The supplementary feature point calculator 32 takes predetermined feature points from among the feature points P0 to P54 that have been set by the feature point detector 31, and on the basis on these feature points, the mask data generator 43 calculates and sets supplementary feature points with respect to the face region. In the example in FIG. 6, the supplementary feature point calculator 32 sets the following: the supplementary feature points Px0 and Px6 are set beside the corners of the eyes; the supplementary feature points Px1, Px2, Px8, and Px7 are set on the cheeks below the eyes; the supplementary feature points Px3 and Px9 are set on the cheeks above the corners of the mouth; the supplementary feature points Px4 and Px10 are set on the cheeks beside the corners of the mouth; and the supplementary feature points Px5 and Px11 are set on the cheeks below the corners of the mouth.

For example, the supplementary feature point Px0 set beside the corner of the right eye may be calculated by the supplementary feature point calculator 32 from the feature P15 at the right edge of the right eye, and from the feature P19 at the left edge of the right eye. Feature points and supplementary feature points are computed using normalized values that take the upper-left corner of the face region as the origin (0,0). For example, if the XY coordinates of the feature point P15 are taken to be P15(X,Y), and if the XY coordinates of the feature point P19 are taken to be P19(X,Y), then the XY coordinates Px0(X,Y) of the supplementary feature point Px0 may be calculated according to Px0(X,Y)=P15(X,Y)+(P15(X,Y)−P19(X,Y))/2. In this way, the supplementary feature point Px0 is defined at a position extending outward (i.e., toward the face outline) from the right edge of the right eye by a length equal to half the horizontal width of the right eye.

In addition, the supplementary feature point Px1 set on the cheek under the eye may be calculated by the supplementary feature point calculator 32 from the feature point P15 at the right edge of the right eye, and from the feature point P41 at the right edge of the mouth. In other words, if the XY coordinates of the feature point P15 are taken to be P15(X,Y), and if the XY coordinates of the feature point P41 are taken to be P41(X,Y), then the XY coordinates Px1(X,Y) of the supplementary feature point Px1 may be calculated according to Px1(X,Y)=P15(X,Y)+(P41(X,Y)−P15(X,Y))*¼. In this way, the supplementary feature point Px1 is defined at a position extending toward the right edge of the mouth from the right edge of the right eye by a length equal to one-fourth the distance between the right edge of the right eye and the right edge of the mouth.

Similarly, the supplementary feature point Px2 is defined at a position extending toward the right edge of the mouth from the left edge of the right eye by a length equal to one-fourth the distance between the left edge of the right eye and the right edge of the mouth. The supplementary feature point Px3 is defined at a position extending toward the right edge of the mouth from the center point along the horizontal width of the right eye by a length equal to three-fourths the distance between the center point along the horizontal width of the right eye and the right edge of the mouth. In addition, the supplementary feature point Px4 is defined at a position extending outward from the right edge of the mouth (i.e., away from the left edge of the mouth) by a length equal to one-fourth the distance between the mouth edges. The supplementary feature point Px5 is defined at a position extending from the right edge of the mouth and away from the left edge of the right eye by a length equal to one-fourth the distance between the left edge of the right eye and the right edge of the mouth.

Likewise, the supplementary feature points Px6 to Px11 are defined on the left side of the face so as to be left/right symmetric with the respective supplementary feature points Px0 to Px5 set on the right side of the face.

In this way, the positions defined for the supplementary feature points Px0 to Px11 are positions in the face region where color variation is small. For this reason, it is difficult to automatically detect these supplementary feature points on the basis of color variation like the feature points. Furthermore, even if the user were to operate the input apparatus 13 to set the supplementary feature points, it is difficult to determine the positions of the supplementary feature points from the face region, and thus it is difficult to reliably set the supplementary feature points. In contrast, in the image processing apparatus 11, the supplementary feature point calculator 32 calculates the supplementary feature points from the feature points. For this reason, the supplementary feature points can be reliably defined, even at positions where the color variation is small.

Figure 7:
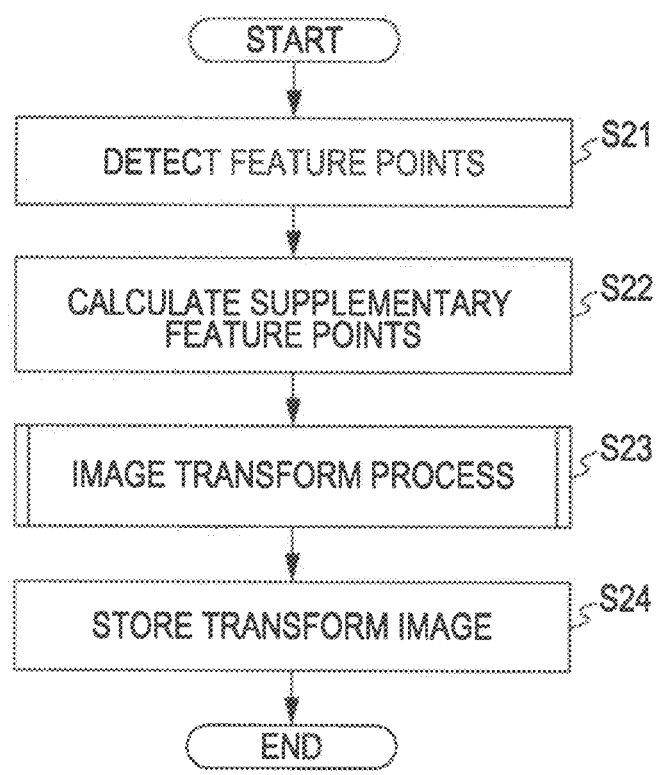
FIG. 7 is a flowchart explaining a process for generating a transform image.

FIG. 7 is a flowchart explaining the transform image generation process in step S12 of FIG. 3.

In step S21, a face recognition process is conducted in the transform image generator 22 with respect to the original image that was supplied from the imaging apparatus 12 in step S11 of FIG. 3. In the face recognition process, the face region where the user's face appears is recognized. Subsequently, the feature point detector 31 detects the feature points P0 to P54 from the face region as described with reference to FIG. 5. The process then proceeds to step S22.

In step S22, the supplementary feature point calculator 32 calculates the supplementary feature points Px0 to Px11 as described with reference to FIG. 6. The supplementary feature point calculator 32 calculates the supplementary feature points on the basis of the feature points P0 to P54 that were detected by the feature point detector 31 in step S21.

After the processing in step S22, the process proceeds to step S23, at which point the image transform processor 33 uses the feature points P0 to P54 as well as the supplementary feature points Px0 to Px11 to conduct the image transform process for transforming the face in the original image (see FIG. 12 later described).

In step S24, the transform image generator 22 outputs the transform image generated by the image transform processor 33 in the transform image generation process of step S23. The controller 25 then causes the transform image output from the transform image generator 22 to be stored in the storage unit 21, and the process is terminated.

The image transform process executed by the image transform processor 33 will now be described with reference to FIGS. 8 to 12.

Figure 8:
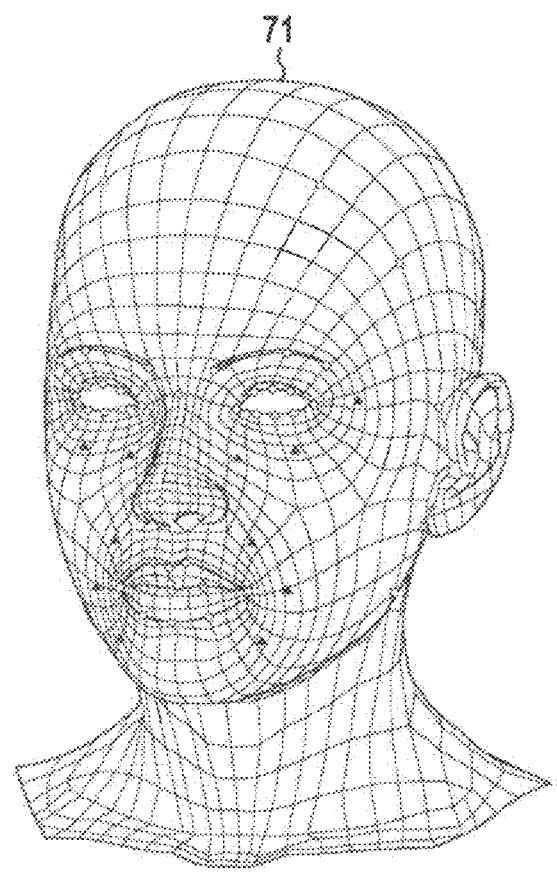
FIG. 8 illustrates a three-dimensional face shape.

FIG. 8 illustrates a three-dimensional face shape, to which is applied a texture image generated from an image presenting the user's face.

In FIG. 8, the face shape 71 is expressed by a plurality of curves that prescribe the surface of a three-dimensional shape. In the face shape 71, there are many vertices (i.e., points where respective curves intersect) set at the eyes, mouth, and other areas with complex shapes. These areas with complex shapes are modeled closely after the shape of an actual face.

As also illustrated in FIG. 8, when the face shape 71 is viewed from the front, circles are illustrated at locations corresponding to the feature points described in FIG. 5 are indicated by circles, and triangles are illustrated at locations corresponding to the supplementary feature points described in FIG. 6. Herein, the feature points and the supplementary feature points are set from the frontal direction of the face shape 71 because, in the present embodiment, feature points and supplementary feature points are defined assuming that a frontal view of a face appears in the original image. In contrast, consider the case where an original image presenting a face profile is to be processed, for example. In this case, the processing would involve defining feature points and supplementary feature points in accordance with the face profile, and thus defining feature points and supplementary feature points for when the face shape 71 is viewed from one side.

Figure 9:
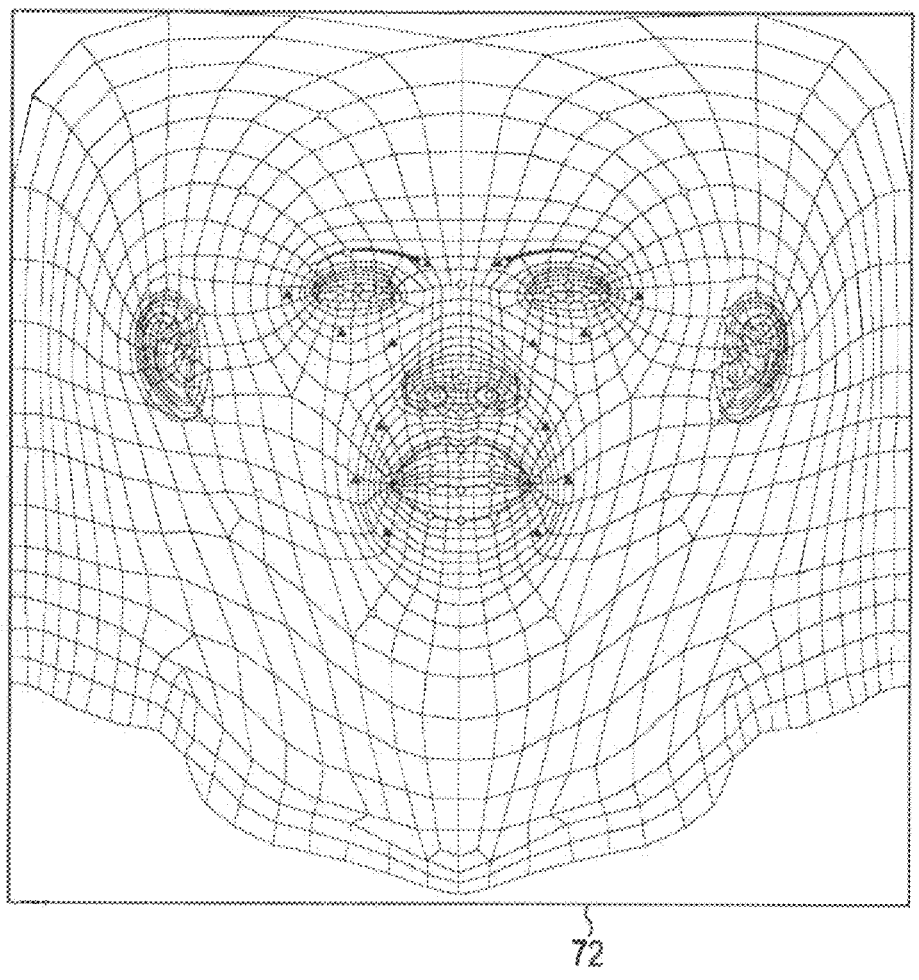
FIG. 9 illustrates a texture image that depicts the surface of a face shape projected onto a flat plane.

FIG. 9 illustrates a texture image (i.e., a projected image) in which the surface of the face shape 71 (i.e., a curved surface) has been projected onto a flat plane.

Since the texture image 72 is the projection of a three-dimensional curved surface onto a flat plane, the user's face is expressed in a deformed way compared to an image capturing a frontal view of the user's face. Furthermore, in the texture image 72, circles and triangles are illustrated at locations corresponding to the feature points and supplementary feature points illustrated in the face shape 71.

At this point, generating a texture image from an original image presenting the user's face involves conducting a process for transforming the original image such that individual points in the original image match (i.e., are mapped to) corresponding individual points in the texture image 72. In other words, the texture image 72 is a projection of the surface of the face shape 71 onto a flat plane, and is used as a template texture image for transforming an original image presenting the user's face into a texture image to be applied to that face shape 71. Consequently, in the image transform process, the feature points and supplementary feature points in the texture image 72 become the target points when translating the feature points and supplementary feature points set in the original image. Herein, it should be appreciated that a texture image 72 like that illustrated in FIG. 9 may be omitted where appropriate. The image transform process can still be conducted as long as target points are at least defined for translating the feature points and supplementary feature points in the original image (i.e., as long as the feature points and supplementary feature points in the texture image 72 are defined in some way).

Hereinafter, in the image transform process for transforming an original image while using the texture image 72 as a template, the feature points and supplementary feature points that are detected and calculated from the original image will be referred to as the transform points, while the feature points and supplementary feature points in the texture image 72 will be referred to as the target points.

In the image transform process, the image transform processor 33 segments the texture image 72 into a plurality of triangular regions, using the target points as vertices. In addition, the image transform processor 33 segments the face region of the original image into a plurality of triangular regions, using the transform points as vertices. The image transform processor 33 then respectively transforms each corresponding pair of triangular regions.

The process whereby the image transform processor 33 segments the texture image 72 into a plurality of triangular regions will now be described with reference to FIG. 10.

The image 73 illustrates the target points set in the texture image 72 of FIG. 9. Herein, the target points are set at 67 locations similarly to the feature points and supplementary feature points (see FIGS. 4 and 5). The image transform processor 33 adds points at the four corners of the texture image 72 to the target points at the above 67 locations, and then specifies the resulting points at 71 locations as the vertices of the triangles for segmenting the texture image 72.

Subsequently, the image transform processor 33 computes line segments respectively connecting all vertices to each other, as illustrated in the image 74. The image transform processor 33 then successively selects each of these line segments in order of shortest length, and determines whether or not to use the selected line segment as the side of a triangle.

For example, if a selected line segment intersects other line segments, then the image transform processor 33 determines to not use that selected line segment as the side of a triangle. In contrast, if a selected line segment does not intersect other line segments, then the image transform processor 33 determines to use that selected line segment as the side of a triangle. In addition, even if a selected line segment intersects another line segment, the image transform processor 33 determines to use that selected line segment as the side of a triangle if it has already been determined that the other line segment intersecting the selected line segment will not be used as the side of a triangle.

The image transform processor 33 makes such determinations for all line segments, and determines which line segments to use as the sides of triangles from among the line segments connecting all vertices (i.e., the target points plus the four corner points). In so doing, the texture image 72 is segmented into a plurality of triangular regions, as illustrated in the image 75.

In addition, the image transform processor 33 uses the transform points in the face region of the original image as well as points at the four corners of the face region to segment the face region of the original image into a plurality of triangular regions associated with the plurality of triangles segmenting the texture image 72. In other words, if a triangle is formed in the texture image 72 with the feature points P7, P8, and P41 as vertices, then the image transform processor 33 forms a triangle in the face region of the original image with the feature points P7, P8, and P41 as vertices, for example.

It should be appreciated that the method for segmenting a texture image into a plurality of triangles is not limited to a method like the above, and that a texture image may also be segmented into a plurality of triangles by using another algorithm. Furthermore, since the target points in the texture image (FIG. 9) are computed in advance on the basis of feature points and supplementary feature points in the face shape, information indicating line segments forming the sides of a plurality of triangles (i.e., triangle set information) may also be computed and stored in advance in the storage unit 21 together with information indicating the target points.

Subsequently, the image transform processor 33 conducts a process for respectively transforming the triangular regions in the face region of the original image into the corresponding triangular regions in the texture image 72. This process for transforming triangular regions will now be described with reference to FIG. 11.

FIG. 11 illustrates a triangle ABC with vertices given by target points A, B, and C in the texture image 72, as well as a triangle A'B'C' with vertices given by transform points A', B', and C' in the face region of the original image.

First, if the vector $V_{AB}$ is taken to be the vector pointing from the target point A to the target point B, and if the vector $V_{AC}$ is taken to be the vector pointing from the target point A to the target point C, then an arbitrary point P on the triangle ABC is expressed by $P=A+\alpha \times V_{AB}+\beta \times V_{AC}$. Herein, the variable $\alpha$ expressing the ratio of the vector $V_{AB}$ is computed by $\alpha=$(Y coordinate of the point P×X component of the vector $V_{AC}$−X coordinate of the point P×Y component of the vector $V_{AC}$)/(X component of the vector $V_{AC}$×Y component of the vector $V_{AB}$−Y component of the vector $V_{AC}$×X component of the vector $V_{AB}$). The variable $\beta$ expressing the ratio of the vector $V_{AC}$ is computed by $\beta=$(X coordinate of the point P×Y component of the vector $V_{AB}$−Y coordinate of the point P×X component of the vector $V_{AB}$)/(X component of the vector $V_{AC}$×Y component of the vector $V_{AB}$−Y component of the vector $V_{AC}$×X component of the vector $V_{AB}$).

Similarly, if the vector $V_{A'B'}$ is taken to be the vector pointing from the transform point A' to the transform point B', and if the vector $V_{A'C'}$ is taken to be the vector pointing from the transform point A' to the transform point C', then an arbitrary point P' on the triangle A'B'C' is expressed by $P'=A'+\alpha' \times V_{A'B'}+\beta' \times V_{A'B'}$.

Herein, in order to make the relationship between the target points A, B, C and the point P equivalent to the relationship between the transform points A', B', C' and the point P', $\alpha'=\alpha$ and $\beta'=\beta$ are defined. In so doing, the coordinates of a point P' can be computed with respect to a point P, and thus the region of the triangle A'B'C' can be transformed into the region of the triangle ABC by respectively referencing the pixels at the points P' inside the triangle A'B'C' that correspond to all points P inside the triangle ABC.

By conducting a process for transforming triangular regions in this way with respect to all triangular regions in the face region of an original image, the face region of the original image is transformed such that the transform points are mapped to the target points.

Figure 12:
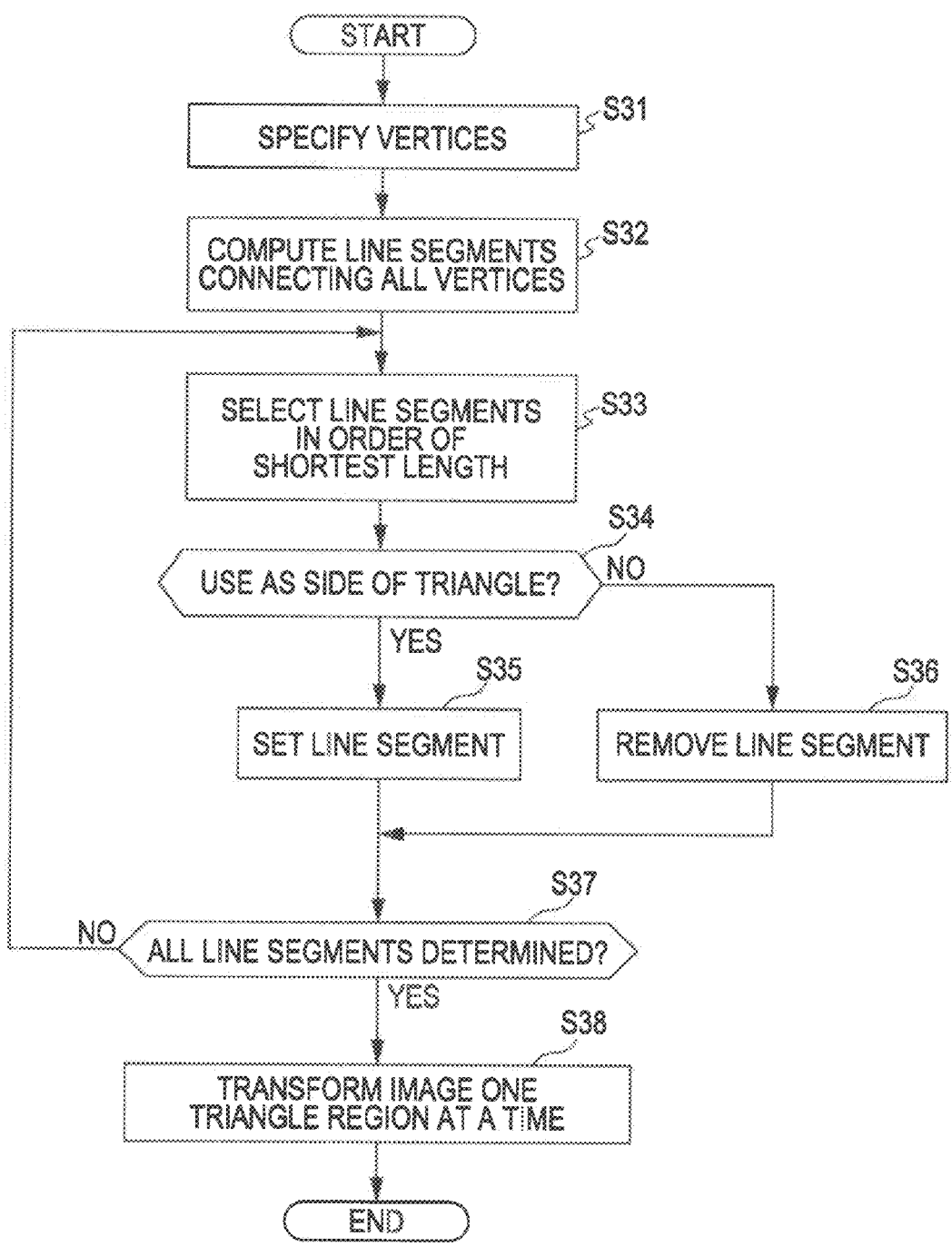
FIG. 12 is a flowchart explaining an image transform process.

FIG. 12 is a flowchart describing the image transform process in step S23 of FIG. 7.

Figure 10:
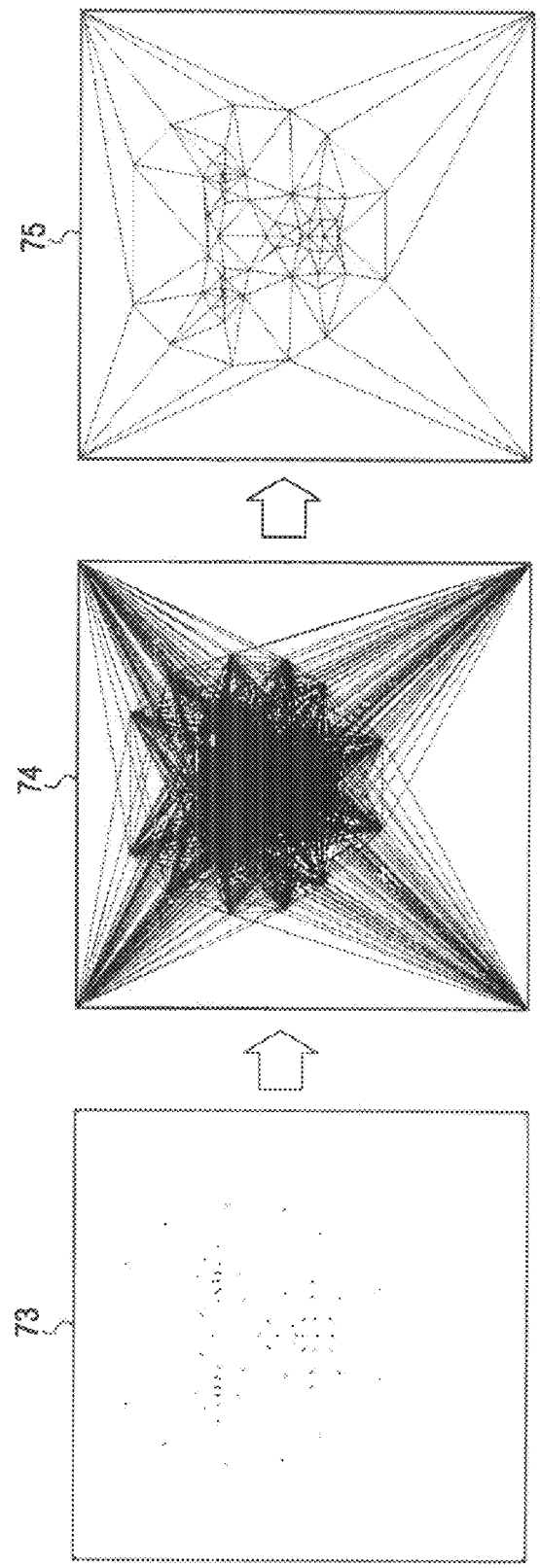
FIG. 10 is a diagram for explaining a process for segmenting a texture image into a plurality of triangular regions.

In step S31, the image transform processor 33 adds the four corner points to the feature points and supplementary feature points, and specifies the resulting 71 points as the vertices of the triangles for segmenting the original image, as illustrated by the image 73 in FIG. 10.

After the processing in step S31, the process proceeds to step S32, at which point the image transform processor 33 computes line segments respectively connecting all vertices to each other, as illustrated by the image 74 in FIG. 10. The process then proceeds to step S33.

In step S33, the image transform processor 33 sorts the line segments computed in step S32 in order of shortest length. The image transform processor 33 then selects undetermined line segments in order of shortest length, and the process proceeds to step S34.

In step S34, the image transform processor 33 takes a line segment selected in step S33, and determines whether or not to use that line segment as the side of a triangle for segmenting the original image.

If the image transform processor 33 determines in step S34 to use the current line segment as the side of a triangle, then the process proceeds to step S35, and the image transform processor 33 sets that line segment for use as the side of a triangle (i.e., the image transform processor 33 keeps the line segment). In contrast, if the image transform processor 33 determines in step S34 to not use the current line segment as the side of a triangle, then the process proceeds to step S36, and the image transform processor 33 removes that line segment from use as the side of a triangle (i.e., the image transform processor 33 deletes the line segment).

After the processing in step S35 or S36, the process proceeds to step S37, at which point the image transform processor 33 determines whether or not the determination in step S34 has been made for all line segments computed in step S32.

If the image transform processor 33 determines in step S37 that the determination in step S34 has not been made for all line segments, then the process returns to step S33 and the next shortest line segment is selected. Thereafter, similar processing is repeated.

In contrast, if the image transform processor 33 determines in step S37 that the determination in step S34 has been made for all line segments, then the process proceeds to step S38. In other words, in this case, the original image has been segmented by a plurality of triangles, as illustrated by image 75 in FIG. 10.

In step S38, the image transform processor 33 transforms the original image one triangular region at a time, as described with reference to FIG. 11. The process is then terminated.

As described above, in the transform image generator 22, a process is conducted whereby characteristic points for a face (i.e., feature points) are detected, supplementary feature points are calculated on the basis of the feature points, and an image is transformed using the feature points and the supplementary feature points. In so doing, areas with complex shapes and areas with simple shapes are segmented by different triangular regions. For this reason, misalignment of image with respect to shape is suppressed when applying the texture image to the face shape, and the texture image can be correctly applied to the face shape. In other words, respective areas of the face shape can be matched to facial features in the texture image.

Typically, in a face shape expressed in three dimensions, the eyes, mouth, and other areas of complex shape are densely allocated with vertices, while the cheeks, jaw, and other areas of simple shape are sparsely allocated with vertices. For example, as illustrated by the face shape 71 in FIG. 8, areas of complex shape are set with more curve intersections (i.e., vertices) than areas of simple shape.

As described earlier, in the process for transforming an image one triangular region at a time, linear transformations are conducted inside the triangles, irrespective of the density of vertices. For this reason, in cases where the density of vertices is skewed inside a triangle, the areas with dense vertices are transformed so as to extend toward the areas with sparse vertices. Consequently, if segmentation into triangular regions were to be conducted with just the feature points, for example, then the areas with dense vertices would greatly exhibit transformation effects, such as extension toward the areas with sparse vertices.

In contrast, in the transform image generator 22, supplementary feature points are set in the vicinity of complex shapes like the eyes and mouth. By thus segmenting the texture image into triangular regions using the feature points and supplementary feature points, the vicinity of the mouth and eyes is segmented into triangles that include the regions with dense vertices and exclude the regions with sparse vertices. In so doing, the areas with dense vertices can be prevented from exhibiting transformation effects, such as extension toward the areas with sparse vertices.

Figure 13A:
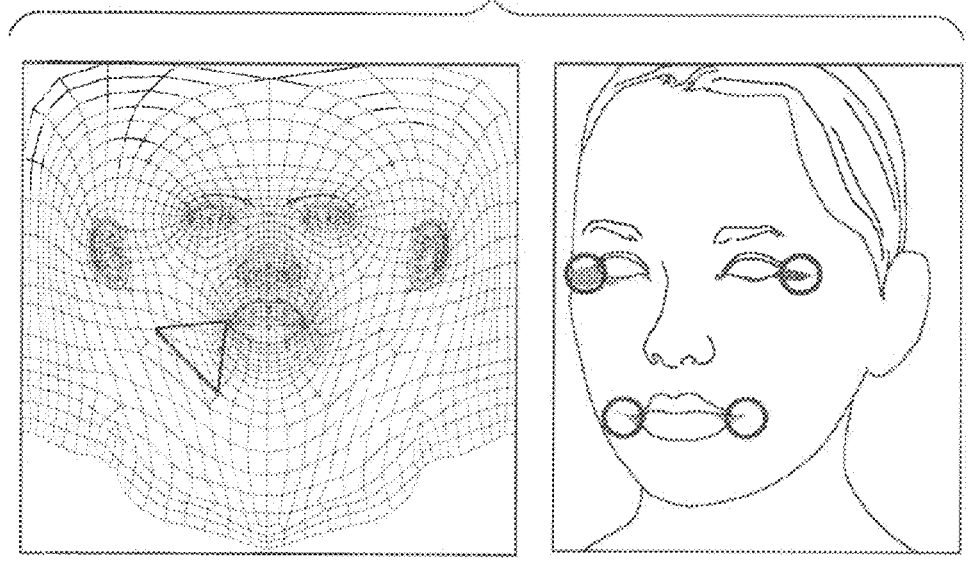
FIG. 13A illustrates the results of a process based on feature points only.
Figure 13B:
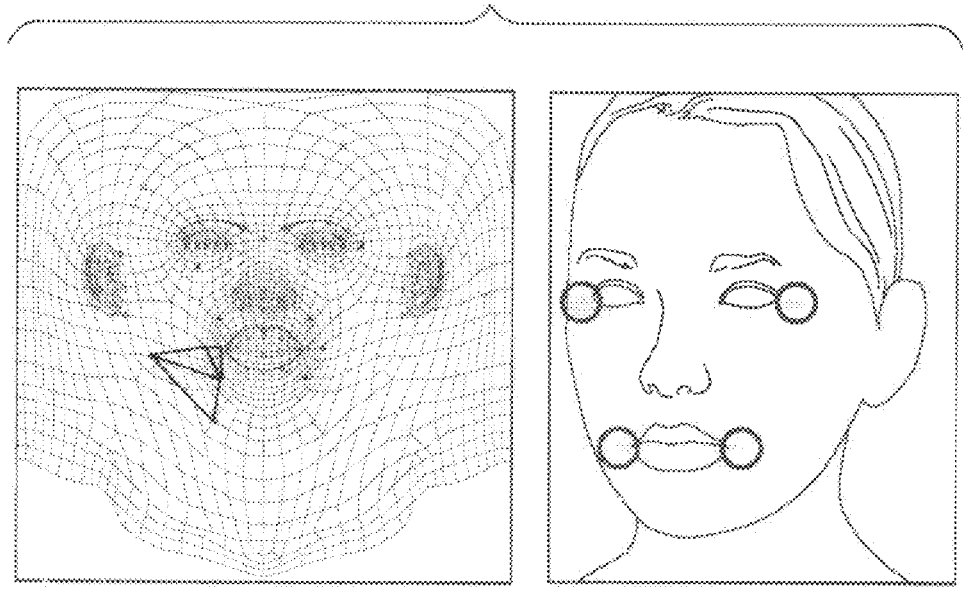
FIG. 13B illustrates the results of a process based on both feature points and supplementary feature points.

By way of example, FIGS. 13A and 13B will be used to compare and describe the results of a process based on feature points only, and a process based on both feature points and supplementary feature points.

FIG. 13A illustrates a texture image set with feature points only, as well as a face model wherein a face shape has been applied with a texture image generated by individually transforming triangular regions with feature points as vertices.

FIG. 13B illustrates a texture image set with both feature points and supplementary feature points, as well as a face model wherein a face shape has been applied with a texture image generated by individually transforming triangular regions with both feature points and supplementary feature points as vertices.

For example, in the texture image in FIG. 13A, the region from the edge of the mouth to the outline of the face is segmented by a single triangle. Within this triangular region, the density distribution is skewed, with the density of vertices increasing closer to the mouth. Consequently, as illustrated in the image of the face model, the texture image is applied to the face model such that the part of the image at the corners of the mouth becomes stretched toward the outline of the face. Similarly, the texture is applied to the face model such that the part of the image at the corners of the eyes becomes stretched toward the outline of the face.

In contrast, in the texture image in FIG. 13B, the region from the edge of the mouth to the outline of the face is segmented by three different triangles into a region with dense vertices near the mouth, and cheek regions with sparse vertices. Consequently, as illustrated in the image of the face model, the texture image is applied to the face model without the part of the image near the corners of the mouth being stretched toward the outline of the face. The corners of the eyes are similarly free of stretching.

In this way, in the transform image generator 22, the image transform processor 33 is able to generate a transform image wherein transformation effects, such as the areas with dense vertices extending toward the areas with sparse vertices, have been suppressed. In other words, in the transform image generator 22, the supplementary feature point calculator 32 is able to set supplementary feature points that enable areas with dense vertices and areas with sparse vertices to be distinguished from each other.

Figure 4:
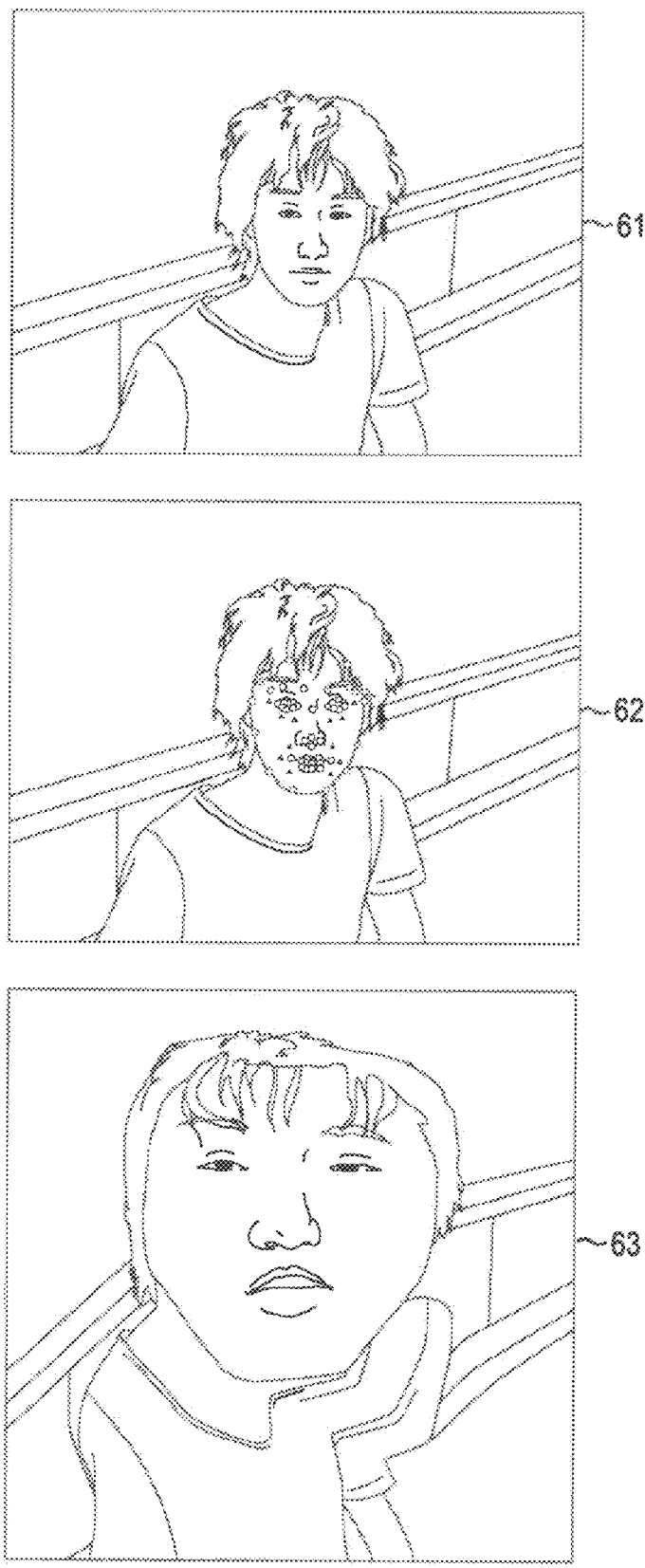
FIG. 4 is a diagram for explaining a process for generating a transform image.

Meanwhile, as illustrated in FIG. 4, not only the user's face but also the background has been captured in the original image 60, and thus a transform image 63 is generated wherein the background is captured in the area extending outward from the outline of the user's face. If a transform image 63 capturing the background in this way were to be applied to a face shape, a face model would be generated with the background applied to the areas extending outward from the outline of the face.

Consequently, in the image processing apparatus 11, the skin color mask processor 23 takes the transform image generated by the transform image generator 22, and conducts a skin color mask process for changing the area extending outward from the outline of the face to a skin color. In the skin color mask processor 23, the skin color extractor 41 takes the transform image generated by the transform image generator 22, and extracts a skin color from skin color extraction regions set on the basis of the supplementary feature points calculated by the supplementary feature point calculator 32.

Figure 14:
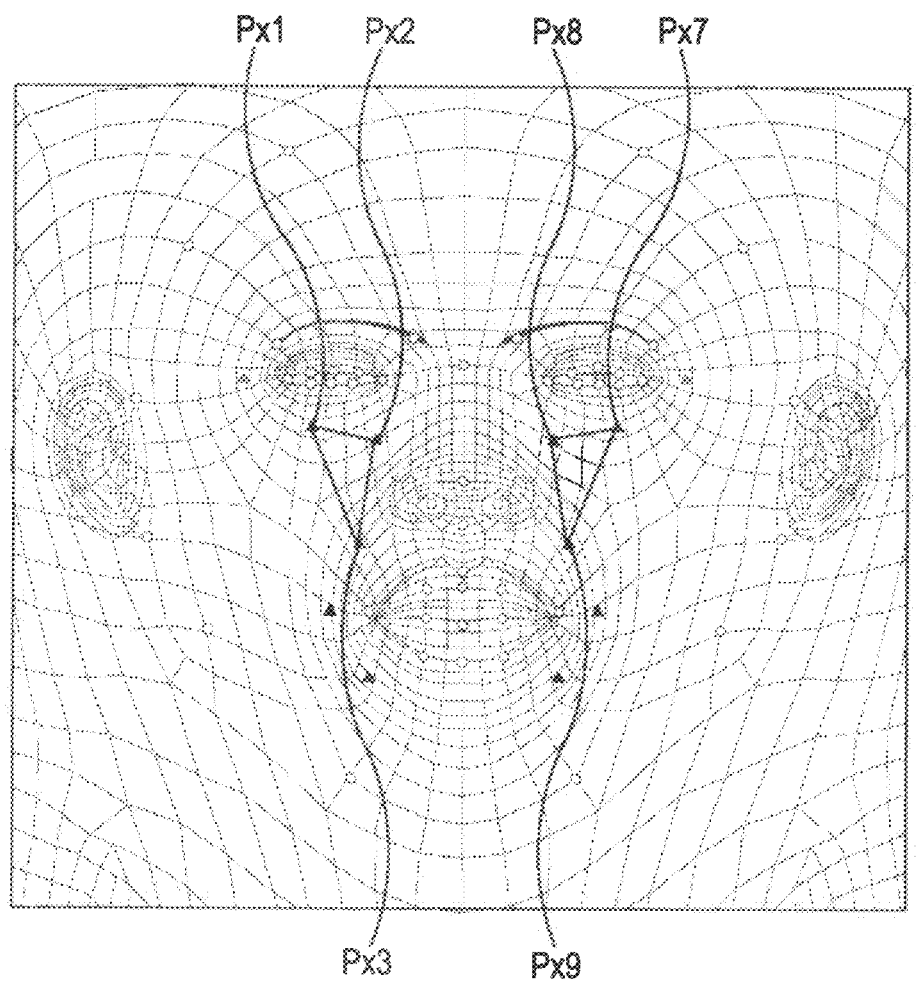
FIG. 14 illustrates one example of skin color extraction regions.

FIG. 14 illustrates one example of skin color extraction regions set by the skin color extractor 41.

As illustrated by the texture image in FIG. 14, the skin color extractor 41 sets the triangular region enclosed by the supplementary feature points Px1 to Px3 as well as the triangular region enclosed by the supplementary feature points Px7 to Px9 as skin color extraction regions. Subsequently, the skin color extractor 41 computes the skin color for use in the skin color mask process by computing the average value of the colors within these two triangular regions. Herein, FIG. 14 illustrates skin color extraction regions defined by supplementary feature points in the texture image. However, it should be appreciated that the supplementary feature point calculator 32 sets supplementary feature points with respect to the original image, and the skin color extractor 41 computes a skin color from skin color extraction regions defined by supplementary feature points in the original image that correspond to the supplementary feature points illustrated in FIG. 14. In other words, the skin color extractor 41 extracts a skin color from skin color extraction regions in the original image.

By setting skin color extraction regions on the basis of supplementary feature points as illustrated in FIG. 14, a skin color can be extracted from regions that do not contain facial features such as the eyes, nose, and mouth, as well from regions that do not contain features such as beard or hair. If elements such as facial features, beard, and hair were contained in the skin color extraction regions, then when the average value is computed for the colors inside the skin color extraction regions, a color that includes the color of the facial features, beard, and hair would be extracted.

In contrast, by setting the skin color extraction regions to be the triangular region enclosed by the supplementary feature points Px1 to Px3 as well as the triangular region enclosed by the supplementary feature points Px7 to Px9, a skin color that is close to the user's skin color can be reliably extracted.

By way of example, Japanese Unexamined Patent Application Publication No. 2001-109907 discloses a technology for extracting a skin color, wherein static regions near the cheeks and slightly inward from the outline of the face are defined, and then skin colors are extracted from the same regions for all types of faces. In other words, since the positions of facial features such as the eyes, nose, and mouth differ from person to person, regions comparatively distant from the respective facial features are set so that such facial features are not included, even when given various types of faces. In other words, regions near the cheeks and slightly inward from the outline of the face are set as the skin color extraction regions. However, these regions may be susceptible to beard, and it is difficult to reliably extract a skin color.

In contrast, the skin color extraction regions used by the skin color extractor 41 to extract a skin color are less susceptible to beard, and are also areas that do not contain facial features such as the eyes, nose, and mouth. In other words, in the present embodiment, the skin color extraction regions are set on the basis of the supplementary feature points, and thus skin color extraction regions that do not contain respective facial features can be reliably set. Consequently, by setting the skin color extraction regions to be the triangular region enclosed by the supplementary feature points Px1 to Px3 as well as the triangular region enclosed by the supplementary feature points Px7 to Px9, skin color can be reliably extracted without being affected by beard and facial parts as compared to the related art.

In the above, the triangular region enclosed by the supplementary feature points Px1 to Px3 as well as the triangular region enclosed by the supplementary feature points Px7 to Px9 are set as skin color extraction regions, as illustrated in FIG. 14. However, it should be appreciated that the above is merely one example of setting skin color extraction regions, and that regions formed by feature points or supplementary feature points other than the above supplementary feature points may be set as skin color extraction regions.

In addition, in the skin color mask processor 23, the mask processor 42 conducts a process for taking the transform image generated by the transform image generator 22, and masking the portion of the transform image extending outward from the outline of the face with the skin color extracted by the skin color extractor 41.

The mask process conducted by the mask processor 42 will now be described with reference to FIG. 15.

Figure 15:
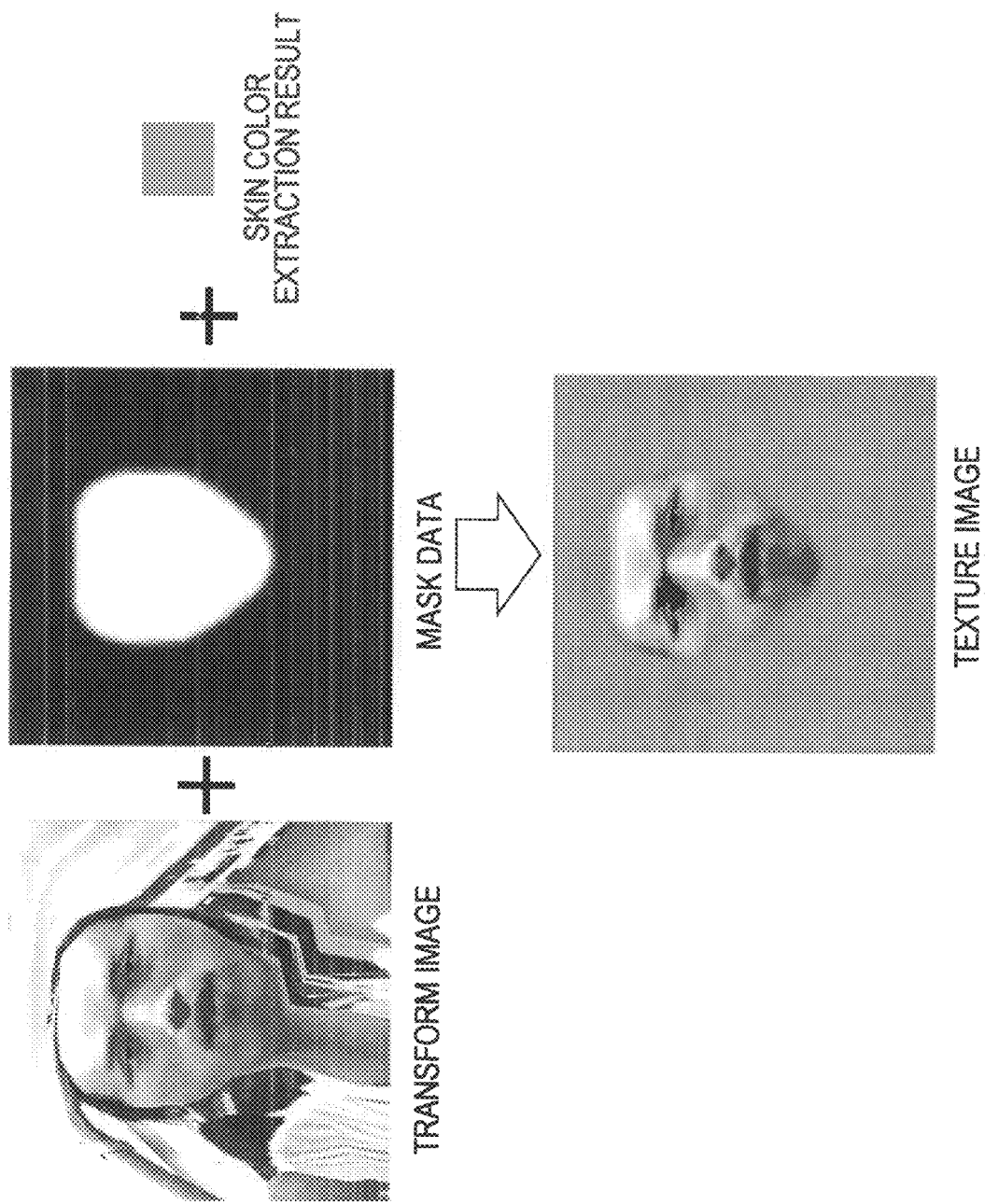
FIG. 15 is a diagram for explaining a mask process.

The upper part of FIG. 15 illustrates a transform image generated by the transform image generator 22, mask data used in the mask process, as well as the extraction result for the skin color extracted by the skin color extractor 41. The lower part of FIG. 15 illustrates the texture image obtained as a resulting of performing the mask process.

The mask data is data expressed in continuous values from 0.0 to 1.0 for each pixel in the transform image generated by the transform image generator 22. These continuous values indicate the degree to which individual pixel values in the transform image are to be used. For a pixel set with a mask data value of 1.0, the pixel value in the transform image to be masked is used as-is, with no modification. For a pixel set with a mask data value of 0.0, the pixel value in the transform image to be masked is not used at all, and is instead substituted with the pixel value of the skin color extraction result. In the mask data illustrated in FIG. 14, mask data values of 0.0 are expressed as black, while mask data values of 1.0 are expressed as white.

Additionally, the mask data values are made to gradually vary at the boundary between the black region and the white region of the mask data. The mask data values are made to gradually vary in order to gradually substitute the skin color in the direction leading outward from the outline of the face in the texture image.

Herein, the mask data used in the skin color mask process may be data that has been prepared in advance, or data that is generated by the mask data generator 43 as described later.

In addition, the mask data is defined in the coordinate system of the texture image 72 based on the face shape (see FIG. 9). For this reason, if the transform image is generated by transforming an image using the texture image 72 as a template, then the mask data can be used for all transform images generated from images presenting arbitrary faces. In other words, if the transform image is generated by the transform image generator 22, then the feature points on the outline of the face are mapped to target point on the outline of the face in the texture image 72. For this reason, mask data like that illustrated in FIG. 15 can be used to reliably substitute the skin color in the portion of the image extending outward from the outline of the face in all transform images generated from images presenting arbitrary faces.

By performing a mask process on a transform image using such mask data, the background portion in the transform image is substituted with the color of the skin color extraction result, and a texture image like that illustrated in the lower part of FIG. 15 is obtained.

Figure 16:
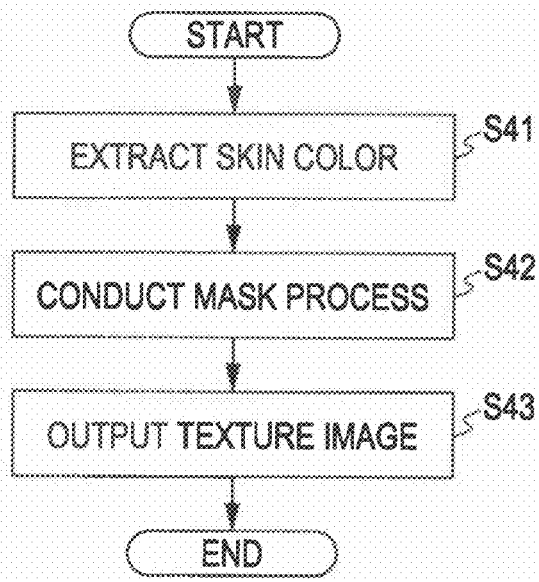
FIG. 16 is a flowchart explaining a skin color mask process.

FIG. 16 is a flowchart explaining the skin color mask process in step S13 of FIG. 3.

In step S41, the skin color extractor 41 reads out an original image stored in the storage unit 21 via the controller 25. In addition, the skin color extractor 41 also takes the supplementary feature points set in the original image by the supplementary feature point calculator 32 in step S22 of FIG. 7, and from among these supplementary feature points, the skin color extractor 41 acquires the supplementary feature points defining the skin color extraction regions (see FIG. 14). The skin color extractor 41 then extracts a skin color by computing the average value of the colors inside the skin color extraction regions of the original image as defined by the acquired supplementary feature points.

In step S42, the mask processor 42 reads out mask data stored in the storage unit 21 via the controller 25, and then generates a texture image by conducting a mask process to substitute the background portion with the skin color in accordance with the retrieved mask data.

In the mask process, the mask processor 42 computes all pixels in the texture image by evaluating p'=p×m+s×(1−m) for all pixels in the transform images. In the above formula, p is the pixel value in the transform image, p' is pixel value in the texture image, s is the pixel value of the skin color extraction result, and m is the mask data value.

In step S43, the mask processor 42 outputs the texture image obtained as a result of the mask process in step S42. The mask processor 42 stores the output texture image in the storage unit 21 via the controller 25, and the process is then terminated.

As described above, in the skin color mask process, the portion of the transform image extending outward from the outline of the face (i.e., the background) can be substituted with a skin color extracted from the face.

Herein, the mask data used in the skin color mask process may be data that has been prepared in advance, or data generated by the mask data generator 43.

The mask data generator 43 may, for example, be able to automatically generate mask data from a texture image like that illustrated in FIG. 9. One method of automatically generating mask data involves defining a closed region formed by the feature points prescribing the outline of the face and set in the texture image. The area inside the closed region (i.e., the non-mask region) is then assigned a value of 1.0, while the area outside the closed region (i.e., the mask region) is assigned a value of 0.0. However, with this method, mask data is generated wherein the color changes suddenly at the boundary between the mask region and the non-mask region. For this reason, using such mask data might result in an unnatural texture image. In other words, it is preferable to obtain mask data like that illustrated in FIG. 15, wherein values smoothly change at the boundary between the mask region and the non-mask region.

Consequently, blur may be added to a mask that has been obtained by assigning 0.0 to the values in the mask region and 1.0 to the values in the non-mask region, for example. By adding such blur, mask data can be obtained wherein values smoothly change at the boundary between the mask region and the non-mask region. However, with mask data obtained in this way, values will smoothly change even extending into the mask region from the boundary between the mask region and the non-mask region. For this reason, the background near the outline of the face will be reflected in the texture image.

In other words, it is desirable to obtain mask data wherein the area inside the mask region extending outward from the boundary between the mask region and the non-mask region is reliably masked with values of 0.0, with the values beginning to change at the boundary and gradually becoming 1.0 in the direction of the non-mask region.

Figure 17:
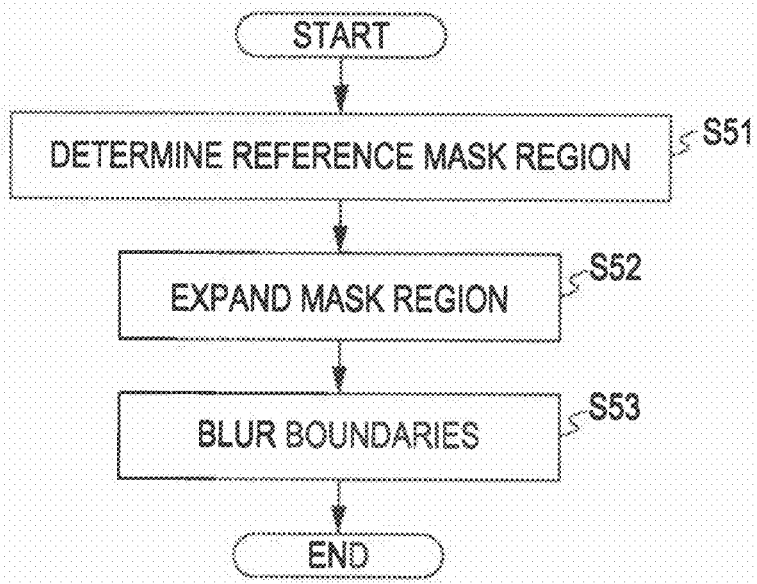
FIG. 17 is a flowchart explaining a process for generating mask data.
Figure 18:
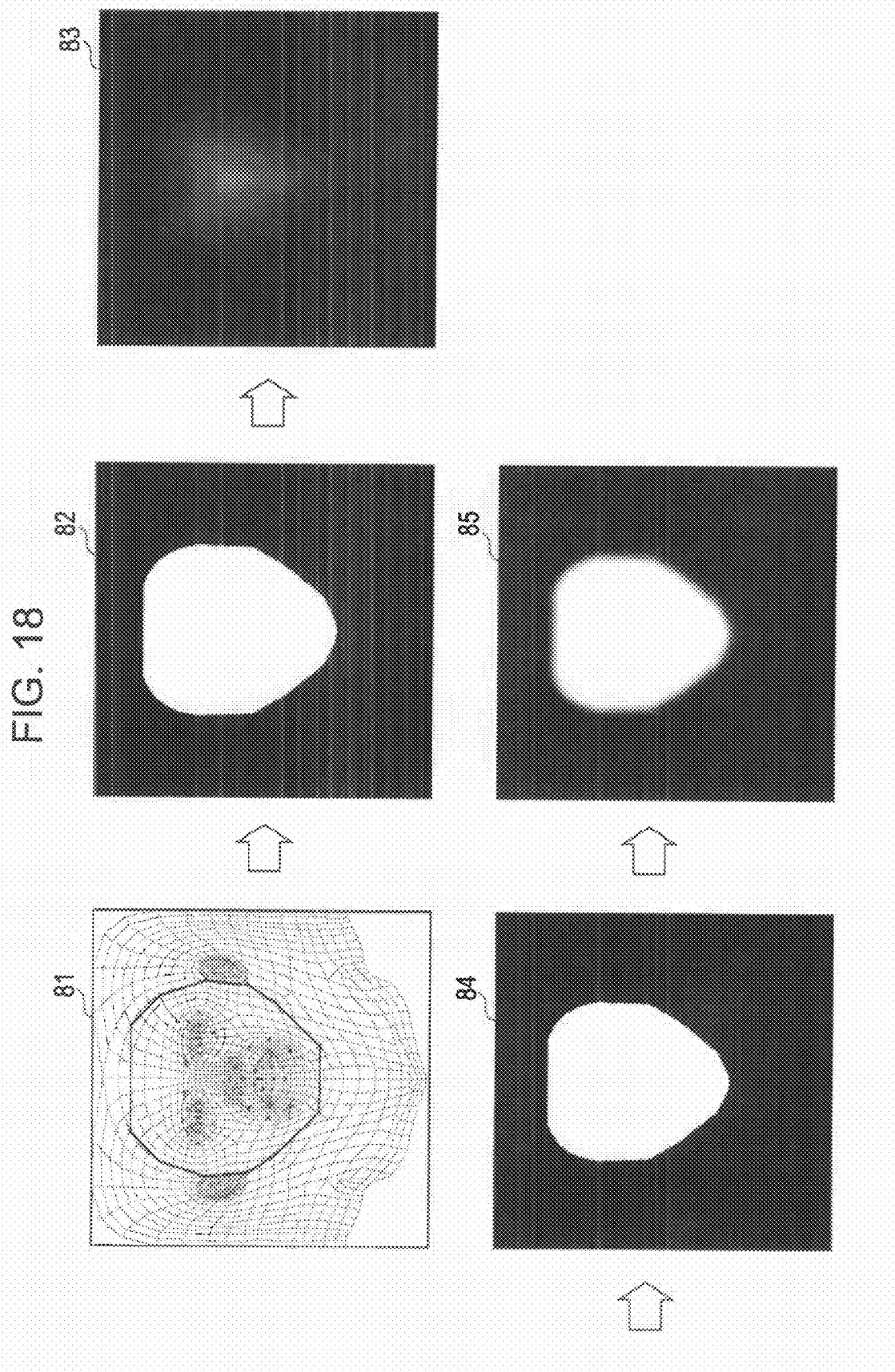
FIG. 18 is a diagram for explaining a process for generating mask data.

A process whereby the mask data generator 43 generates mask data as described above will now be described with reference to FIGS. 17 and 18.

In step S51, the mask data generator 43 determines a reference mask region by defining a closed region formed by predetermined target points. For example, the mask data generator 43 may set the mask region to be the area extending outward from the closed region formed by the target points corresponding to the outline of the face, as illustrated by the texture image 81 in FIG. 18. The mask data generator 43 then assigns 0.0 to values in the mask region, and 1.0 to values in the non-mask region. In so doing, data like that illustrated by the reference mask data 82 is generated.

In step S52, the mask data generator 43 conducts a process to expand the mask region with respect to the reference mask data 82 (i.e., extend the mask region in the direction of the non-mask region).

First, the mask data generator 43 may expand the mask region by a method using a distance transform, for example. A distance transform is a transform method wherein, given individual pixels in an image expressed in binary (i.e., 0 or 1), the distance value of each pixel is taken to be the shortest distance from that pixel's position to the position of a pixel whose value is 0. By means of such a distance transform, the values of the respective pixels illustrated in the reference mask data 82 become values like that illustrated in the distance transform data 83. In the distance transform data 83, areas with small distance values are expressed as black, while areas with large distance values are expressed as white.

Consider, for example, the case where the mask region is expanded by 10 pixels. In this case, the mask data generator 43 subsequently binarizes the distance transform data 83 with a threshold of 10. As a result, 1.0 is assigned to the values of areas with distance values greater than 10, while 0.0 is assigned to areas with distance values less than or equal to 10. By binarizing with a threshold of 10 in this way, the expanded mask data 84 is generated. By the definition of the distance transform, the expanded mask data 84 is the data resulting from expanding the mask region in the reference mask data 82 by 10 pixels.

It should be appreciated that the method for expanding the mask region is not limited to methods utilizing distance transforms, and that other methods, such as those utilizing morphology transforms, for example, may also be used.

In step S53, in order to blur the boundary between the mask region and the non-mask region, the mask data generator 43 conducts a blur process with a radius set to the expansion amount with respect to the expanded mask data 84. The process is then terminated. For the blur process, a simple smoothing filter, Gaussian filter, or similar filter may be used. In so doing, the mask data 85 is generated, having a blurred boundary between the mask region and the non-mask region.

Herein, the expanded mask data 84 has been expanded by 10 pixels with respect to the reference mask data 82 by way of example. For this reason, the mask data generator 43 applies a blur of radius 10. By setting the blur radius in this way, the mask data 85 does not reach the boundary in the reference mask data 82. Additionally, data is obtained wherein the region set as the mask region in the reference mask data 82 is reliably masked, and furthermore wherein the mask values begin to change at the mask region boundary and gradually become 1.0 in the direction of the non-mask region.

The mask processor 42 then uses the mask data 85 generated in this way to conduct the mask process. In so doing, a texture image can be generated wherein a skin color mask is reliably applied to the area extending outward from the outline of the face, and furthermore wherein the skin color mask begins to change at the outline of the face and gradually transitions into the image of the face in the inward direction.

In the image processing apparatus 11 configured as above, a texture image is generated from an image presenting a user's face, a face model expressed by the texture image is generated, and the face model is then displayed on the display apparatus 14.

Figure 19:
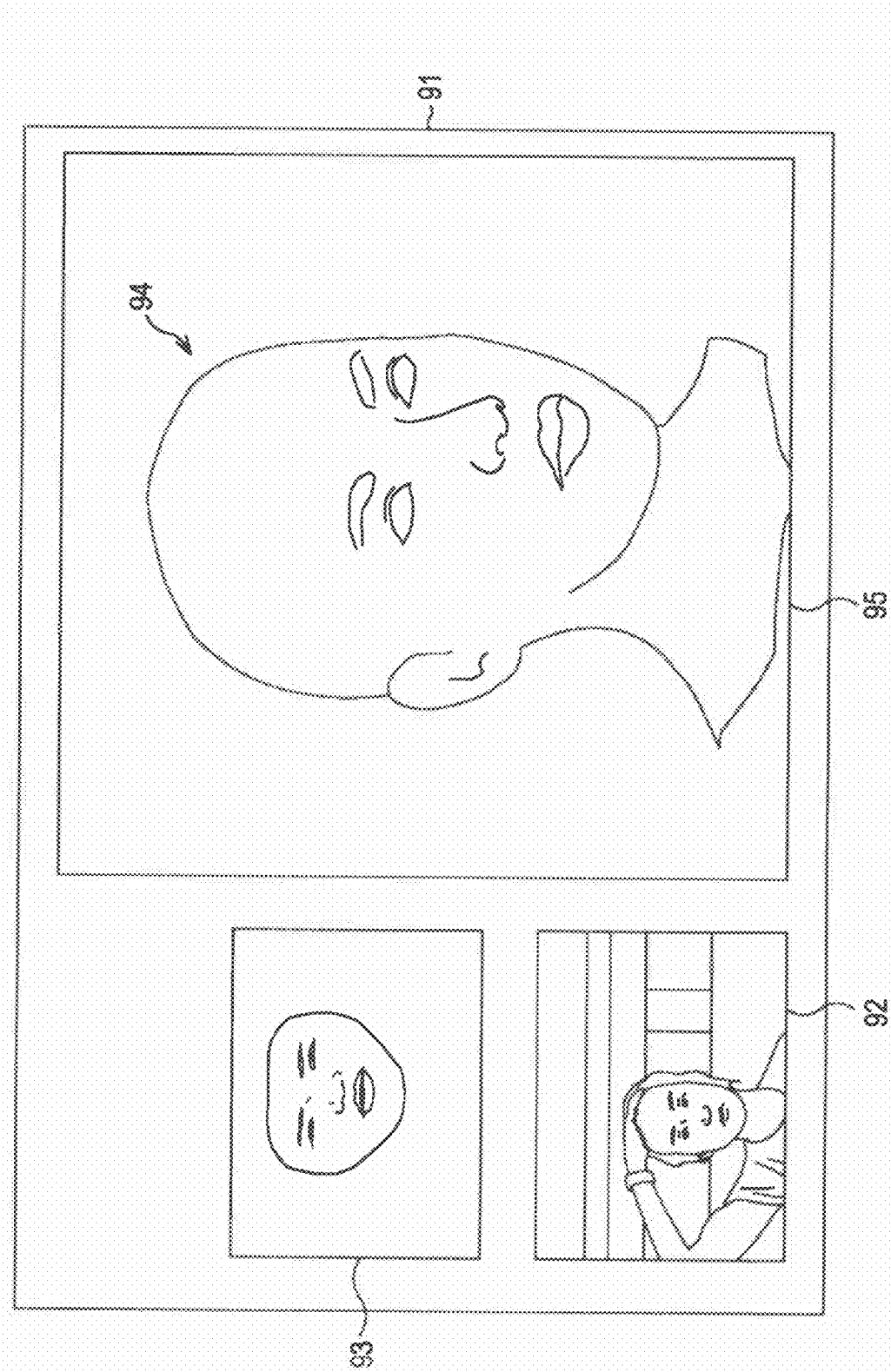
FIG. 19 illustrates an example of a display screen displaying a face model.

FIG. 19 illustrates an example of a display screen displaying a face model on the display apparatus 14.

In the display screen 91 illustrated in FIG. 19, an image 92 acquired by the imaging apparatus 12 is displayed in the lower-left. Above the image 92, there is displayed a texture image 93, which was generated using the image 92 as the original image. In addition, a face model display region 95 is provided in an area taking up approximately ⅔ of the right side of the display screen 91. The face model display region 95 displays a face model 94 to which the texture image 93 has been applied.

Meanwhile, in the image processing apparatus 11, three-dimensional shape data for objects such as hair parts and various accessories such as hats and glasses is stored in the storage unit 21, separately from the shape data for face shapes. The 3D processor 24 is then able to generate images wherein hair, accessories, and other parts have been combined with a generated face model.

Figure 20:
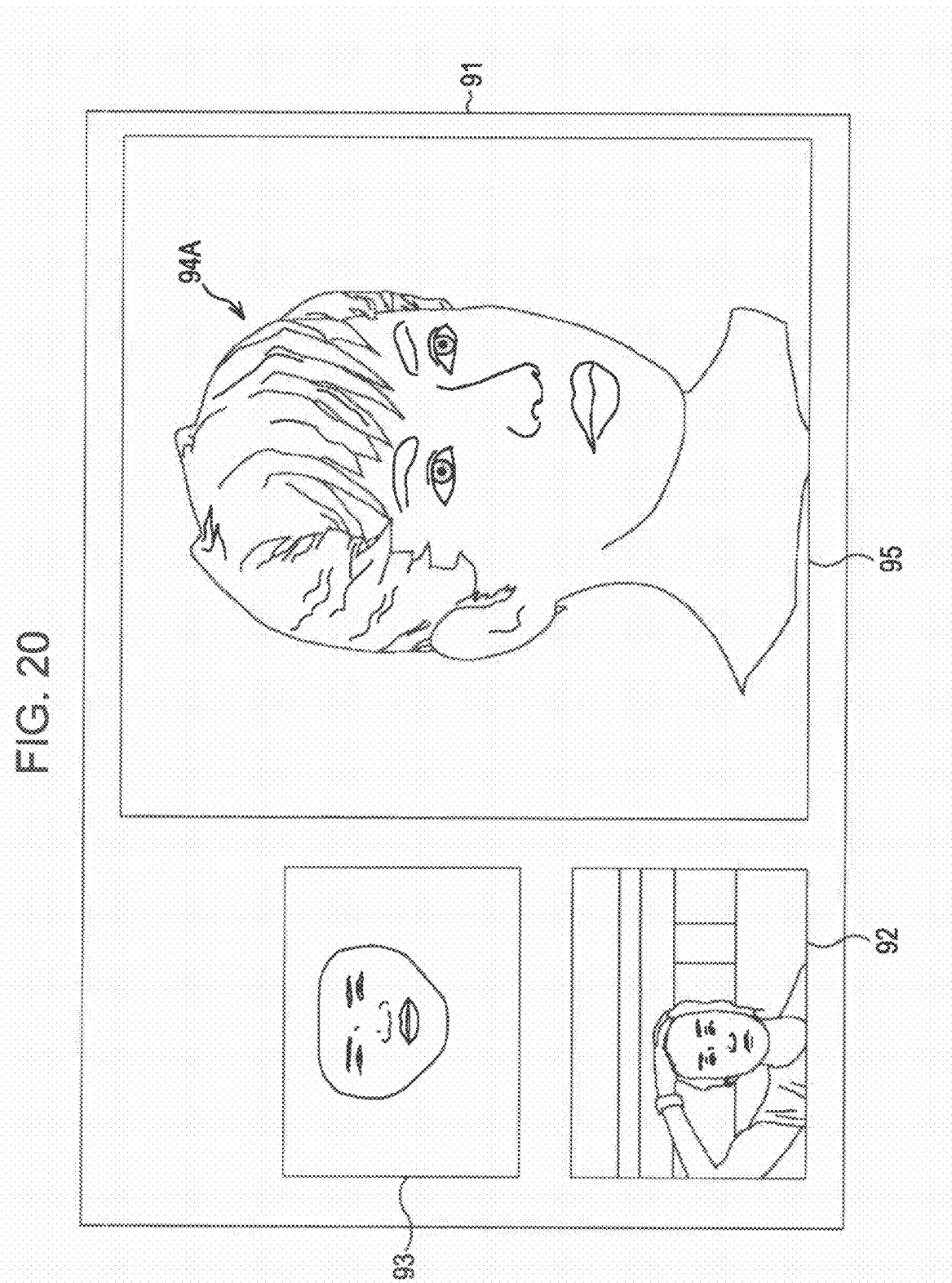
FIG. 20 illustrates an example of a face model combined with a 3D hair shape.
Figure 21:
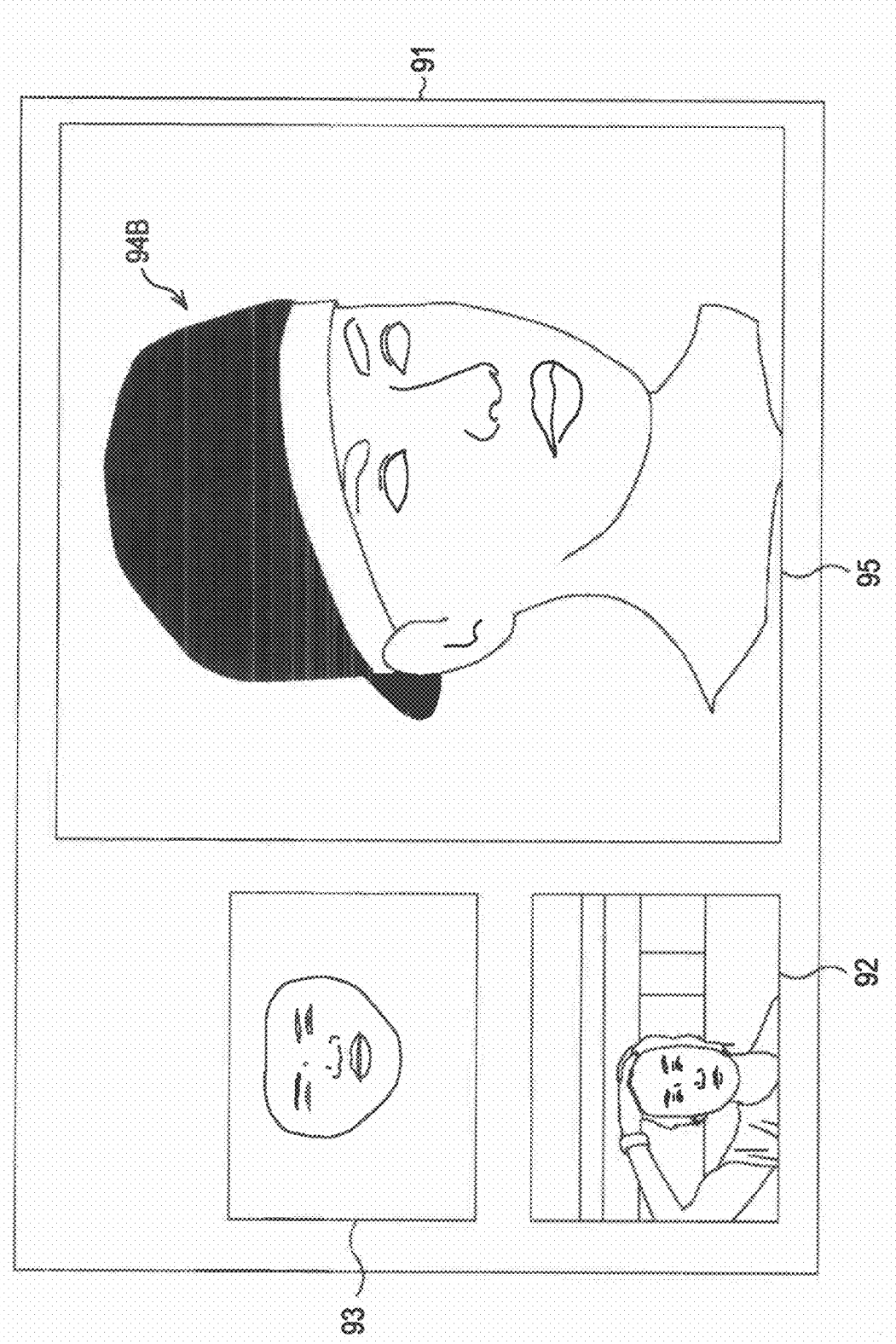
FIG. 21 illustrates an example of a face model combined with a 3D hat shape.

FIG. 20 illustrates a face model 94A by way of example. In the face model 94A, a 3D hair shape has been combined with the face model 94 that was displayed in the face model display region 95 of the display screen 91 in FIG. 19. FIG. 21 similarly illustrates a face model 94B. In the face model 94B, a 3D hat shape has been combined with the face model 94 that was displayed in the face model display region 95 of the display screen 91 in FIG. 19.

In addition, in the image processing apparatus 11, by using images presenting different users' faces, for example, respectively different face models can be generated. In other words, in the image processing apparatus 11, a variety of face models can be easily generated by simply substituting different texture images with respect to the same face shape.

FIGS. 22 to 24 illustrate face models generated by applying different texture images to the same face shape. The different texture images have been generated from images presenting respectively different users' faces. In FIGS. 22 to 24, the image presenting a particular user's face (i.e., the original image) is illustrated on top, the texture image generated from the original image is illustrated in the middle, and the face model obtained by applying the texture image is illustrated on the bottom.

FIG. 22 illustrates a bearded face model generated from an original image presenting a bearded user's face, and reflecting the characteristics of that user's face. FIG. 23 illustrates a face model with raised eyebrows, which reflects the characteristics of the face of a user with raised eyebrows. FIG. 24 illustrates a face model with drooping eyebrows, which reflects the characteristics of the face of a user with drooping eyebrows. In this way, the face characteristics of respectively different users are reflected in the face model, even when the same face shape is used.

In the image processing apparatus 11, original images are transformed so as to match a texture image, which is a flat projection of the surface of the face shape to which the texture image is applied. For this reason, even if different persons are presented in the original images, texture images generated from respective original images can be applied to the face shape such that the various parts in the texture images match the various parts of the face shape. In other words, texture images can be easily substituted with respect to a single face shape.

Consequently, as illustrated in FIGS. 22 to 24, multiple texture images can be switched out with respect to a single face shape, thereby enabling the display of face models that reflect the faces of different users.

In addition, in the image processing apparatus 11, it is also possible to take a texture image generated by the transform image generator 22 and the skin color mask processor 23, and apply thereto an image depicting arbitrary graphics. As a result, a new texture image can be generated, which can then applied to the face shape. In so doing, it is possible to present the effect of applying those graphics to the surface of the face model.

FIG. 25 illustrates a face model presenting face painting. In the face painting illustrated in FIG. 25, two lines are drawn under either eye, and the Japanese flag is positioned on the left cheek.

The face paint image 101 illustrated in FIG. 25 depicts the lines and the Japanese flag. All other areas of the image not depicting the lines or the Japanese flag are treated as transparent regions. The lines and the Japanese flag may be positioned and drawn on the basis of the feature points and supplementary feature points set in the texture image so as to be positioned in a region to be painted, for example.

Such a face paint image 101 is composited (i.e., blended) so as to be overlaid on top of the texture image 102 generated by the transform image generator 22 and the skin color mask processor 23. In so doing, the face painted texture image 103 is generated. Subsequently, the 3D processor 24 applies the face painted texture image 103 to the face shape, thereby generating a face painted face model 104.

In addition, in the image processing apparatus 11, face paint images depicting a variety of designs other than that of the face paint image 101 may be prepared. In so doing, the user can select a face paint image with his or her preferred design, which can then be overlaid with a texture image generated from an image presenting the user's own face. As a result, a face model that has been face painted with the user's preferred design can be generated. Moreover, the respective face paint images with various designs can also be applied to texture images generated from images presenting the faces of respectively different users, thereby allowing the face paint images to be widely reused.

By way of example, FIG. 26 illustrates a face model to which a face paint image depicting kumadori makeup (a type of kabuki makeup) has been applied.

The face paint image 110 illustrated in FIG. 26 depicts kumadori makeup. All other areas of the image not depicting the makeup are treated as transparent regions. The face paint image 110 is then composited so as to be overlaid on top of the texture image 112, thereby generating the texture image 113 painted with kumadori makeup. This texture image 113 is then applied to the face shape to generate a face model 114 painted with kumadori makeup. In this way, by switching out face paint images, face painting with a variety of designs can be presented on a face model.

In the face model 104, the paint areas and the transparent areas are clearly separated as in the face paint images 101 and 110. This exhibits the effect of having painted the face with paint or similar substances. However, face paint images may also be used wherein the paint areas are set to be semi-transparent. For example, a face paint image depicting a semi-transparent red in the lip area can be composited with a texture image to achieve a lipstick effect. By overlaying the texture image with semi-transparent images depicting features in addition to lipstick, such as blush and eye shadow, the effect of a face applied with makeup can be achieved.

The present embodiment is described as processing an image that has been acquired by an imaging apparatus 12 for the purpose of generating a texture image. However, it should be appreciated that other types of images may be processed, such as a previously acquired image being stored in the storage unit 21, or a single frame from a video acquired by the imaging apparatus 12, for example.

Furthermore, the feature point detector 31 and the supplementary feature point calculator 32 may also detect and calculate feature points and supplementary feature points from the face regions in each frame of a video acquired by the imaging apparatus 12, and then select a frame with favorable detection results as the original image.

For example, when feature points are defined at the eyes, nose, and mouth, the relative positions of the eyes, nose, and mouth can be used as a basis for determining whether or not the face appearing in the image is looking forward. If it is assumed that images presenting faces looking forward are to be processed, then on the basis of the determination results, it can be determined that an image presenting a face not looking forward will not be processed. Furthermore, in this case, the user can be induced to look forward by instructing the user how to orient his or her face, for example. More specifically, messages such as "Turn a little to the right" or "Turn a little to the left" can be presented (i.e., displayed or output as audio).

Meanwhile, even if feature points can be automatically detected by the feature point detector 31, the positions of the detected feature points might not correctly detected at desired positions in some cases. In order to account for such cases, the relative positions of certain feature points (i.e., existing information) can be used as a basis for determining whether or not the feature point detection results are favorable. For example, it can be determined whether or not the detected feature points are favorable on the basis of relative positions which indicate that the feature points for the eyes should be positioned above the feature points for the mouth, or alternatively, on the basis of relative positions which indicate that the feature points for facial features such as the eyes, nose, and mouth should be inside the closed region formed by the feature points on the outline of the face.

As described above, in the image processing apparatus 11, feature points and supplementary feature points detected and calculated from an image presenting a user's face are utilized to generate a texture image by transforming an image. For this reason, it becomes possible to generate a texture image that can be correctly applied to a pre-created face shape. In so doing, it becomes possible to generate a face model applied with a texture image created from an image of a user's face, without correcting the existing face shape, for example. Furthermore, it becomes possible to generate a face model reflecting an arbitrary user's face.

For example, in recent years face models are being used in a variety of fields, such as the video game and film industries. With the image processing apparatus 11, a user's face can be reflected in an already-created face model. In other words, just the face of a person in a game or film can be substituted with the face of the user. In so doing, the user can, for example, play a game with a character having the user's own face, thereby making it easier for the user to become involved in the game. Moreover, it becomes easier to conduct a process for switching texture images with respect to an existing face shape.

As another example, consider processes involved in operating an avatar communication space or other service where a large number of avatars are displayed simultaneously. If a 3D face shape were prepared for each individual, it is projected that such processes would become difficult due to general issues such as image processing and data bandwidth. In such an avatar communication space, processes can be easily conducted by using a common face shape and preparing just a texture image for each user. Furthermore, multiple types of face shapes may be prepared, and the user may then be prompted to select a face shape, or a similarly face shape may be automatically selected based on an image of the user's face. In so doing, processes can be conducted more easily compared to the case of preparing a face shape for each user.

The present embodiment is described as using a texture image obtained by projecting the surface of a face shape onto a flat plane. However, depending on the method used to generate the texture image, a texture image may be generated that is not deformed as compared an image presenting a frontal view of the user's face. The respective positions of facial features will still differ from person to person even when given a non-deformed texture image, however, and thus the processes executed by a image processing apparatus 11 in accordance with an embodiment of the present invention are still effective in correctly positioning features such as the eyes and mouth in the texture at the positions of the eyes and mouth in the 3D face shape.

The series of processes described above may be executed in hardware or software. In the case of executing the series of process in software, a program constituting such software may be installed from a program recording medium onto a computer built into special-purpose hardware. Alternatively, the program may be installed onto an apparatus capable of executing a variety of functions by installing various programs thereon, such as a general-purpose personal computer, for example.

FIG. 27 is a block diagram illustrating an exemplary hardware configuration of a computer that executes the series of process described above by means of a program.

In the computer, a central processing unit (CPU) 201, read-only memory (ROM) 202, and random access memory (RAM) 203 are mutually connected via a bus 204.

An input/output interface 205 is additionally connected to the bus 204. The input/output interface 205 is connected to the following: an input unit 206, which includes devices such as a keyboard, mouse, and microphone; an output unit 207, which includes devices such as a display and one or more speakers; a storage unit 208, which includes devices such as a hard disk and non-volatile memory; a communication unit 209, which includes devices such as a network interface; and a drive 210, which drives a removable medium 211 such as a magnetic disk, an optical disc, a magneto-optical disc, or semiconductor memory.

In the computer configured as described above, the series of processes described earlier are conducted as a result of the CPU 201 loading a program stored in the storage unit 208 into the RAM 203 via the input/output interface 205 and the bus 204, and then executing the program, for example.

The program executed by the computer (i.e., the CPU 201) may, for example, be recorded onto the removable medium 211, which may be an instance of packaged media realized by means of magnetic disks (including flexible disks), optical discs (such as Compact Disc Read-Only Memory (CD-ROM) and Digital Versatile Disc (DVD) discs), magneto-optical discs, or semiconductor memory. Alternatively, the program may be provided via a wired or wireless transmission medium, such as a local area network, the Internet, or digital satellite broadcasting.

By loading the removable medium 211 into the drive 210, the program can be installed to the storage unit 208 via the input/output interface 205. Alternatively, the program may be received by the communication unit 209 via a wired or wireless transmission medium and then installed to the storage unit 208. Besides the above, the program may also be installed in advance to the ROM 202 or the storage unit 208.

It should also be appreciated that the program executed by the computer may be a program wherein individual processing steps are conducted in a time series following the order described in the present specification, or a program wherein individual processing steps are conducted in parallel or at appropriate timings, such as when called. In addition, the program may be processed by a single computer, or processed in a distributed manner by a plurality of computers. Furthermore, the program may also be forwarded to a remote computer and executed remotely.

It should be appreciated that an embodiment of the present invention is not limited to that described above, and that various modifications are possible without departing from the scope and spirit of the present invention.

The present application contains subject matter related to that disclosed in Japanese Priority Patent Application JP 2009-260850 filed in the Japan Patent Office on Nov. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a processing circuit configured to
acquire feature points, which are characteristic points on a face in an image;
calculate distinct supplementary feature points in the image based on a combination of the acquired feature points; and
utilize the feature points and the distinct supplementary feature points to transform the image to match a reference face in a projected image, wherein the projected image is a representation of a three-dimensional face shape of the reference face that has been projected onto a flat plane, wherein the feature points are acquired in the form of at least both ends of the eyes in the image, and the distinct supplementary points are calculated in the form of points at positions separated from the outward ends of the eyes in the image by a predetermined distance and extending toward the outline of the face, and points at positions separated from both ends of the eyes by a predetermined distance and extending toward the mouth.

2. The image processing apparatus according to claim 1, wherein the feature points are acquired in the form of at least both ends of the mouth in the image, and
the distinct supplementary feature points are calculated in the form of points at positions separated from both ends of the mouth in the image by a predetermined distance and extending toward the eyes,
points at positions separated from both ends of the mouth in the image by a predetermined distance and extending away from the eyes, and
points at positions separated from one end of the mouth in the image by a predetermined distance and extending toward the other end.

3. The image processing apparatus according to claim 1, wherein the feature points are acquired in the form of at least the outline of the face in the image, and the processing circuit is further configured to
use the feature points as a basis for generating a texture image and substitute a skin color in the area extending outward from the outline of the face in the transformed image.

4. The image processing apparatus according to claim 3, wherein the processing circuit is further configured to
extract a skin color of the face presented in the image from one or more predetermined regions defined by any of the feature points or the distinct supplementary feature points, wherein the substituted area extends outward from the outline of the face.

5. The image processing apparatus according to claim 3, wherein the processing circuit is further configured to
generate a face model wherein the texture image has been applied to a reference face shape, wherein the face model generating means applies to the reference face shape a new texture image, which is obtained by compositing the texture image with a given image.

6. An image processing method, comprising:
acquiring feature points which are characteristic points on a face in an image;
calculating distinct supplementary feature points in the image based on a combination of the acquired feature points; and
utilizing the acquired feature points and the calculated distinct supplementary feature points to transform the image to match a reference face in a projected image, wherein the projected image is a representation of a three-dimensional face shape of the reference face that has been projected onto a flat plane, wherein the feature points are acquired in the form of at least both ends of the eyes in the image, and the distinct supplementary points are calculated in the form of points at positions separated from the outward ends of the eyes in the image by a predetermined distance and extending toward the outline of the face, and points at positions separated from both ends of the eyes by a predetermined distance and extending toward the mouth.

7. A non-transitory computer readable medium having stored thereon a program that when executed by a computer causes the computer to execute an image processing method comprising:
acquiring feature points which are characteristic points on a face in an image;
calculating distinct supplementary feature points in the image based on a combination of the acquired feature points; and
utilizing the acquired feature points and the calculated distinct supplementary feature points to transform the image to match a reference face in a projected image, wherein the projected image is a representation of a three-dimensional face shape of the reference face that has been projected onto a flat plane, wherein the feature points are acquired in the form of at least both ends of the eyes in the image, and the distinct supplementary points are calculated in the form of points at positions separated from the outward ends of the eyes in the image by a predetermined distance and extending toward the outline of the face, and points at positions separated from both ends of the eyes by a predetermined distance and extending toward the mouth.

8. An image processing apparatus, comprising:
feature point acquiring means for acquiring feature points, which are characteristic points on a face in an image;
distinct supplementary feature point calculating means for calculating distinct supplementary feature points in the image based on a combination of the feature points acquired by the feature point acquiring means; and
transform means for utilizing the feature points and the distinct supplementary feature points to transform the image to match a reference face in a projected image, wherein the projected image is a representation of a three-dimensional face shape of the reference face that has been projected onto a flat plane, wherein the feature points are acquired in the form of at least both ends of the eyes in the image, and the distinct supplementary points are calculated in the form of points at positions separated from the outward ends of the eyes in the image by a predetermined distance and extending toward the outline of the face, and points at positions separated from both ends of the eyes by a predetermined distance and extending toward the mouth.

* * * * *